US011754815B2

(12) United States Patent
Hirano

(10) Patent No.: US 11,754,815 B2
(45) Date of Patent: Sep. 12, 2023

(54) IMAGING LENS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

(*) Notice: Subject to any disclaimer, the term of this patent is extended or adjusted under 35 U.S.C. 154(b) by 0 days.

(21) Appl. No.: 17/391,815

(22) Filed: Aug. 2, 2021

(65) Prior Publication Data

US 2021/0356717 A1 Nov. 18, 2021

Related U.S. Application Data

(63) Continuation of application No. 16/894,418, filed on Jun. 5, 2020.

(30) Foreign Application Priority Data

Sep. 3, 2019 (JP) .................. 2019-160510

(51) Int. Cl.
*G02B 13/00* (2006.01)
*G02B 27/00* (2006.01)
(Continued)

(52) U.S. Cl.
CPC ........... *G02B 13/0045* (2013.01); *G02B 9/64* (2013.01); *G02B 13/18* (2013.01); *G02B 27/0025* (2013.01)

(58) Field of Classification Search
CPC .. G02B 13/0045; G02B 13/18; G02B 13/002; G02B 13/0015; G02B 9/64; G02B 27/0025
See application file for complete search history.

(56) References Cited

U.S. PATENT DOCUMENTS

| 2017/0329108 | A1 | 11/2017 | Hashimoto | |
| 2021/0157098 | A1* | 5/2021 | Hirano | G02B 13/0045 |
| 2021/0364756 | A1* | 11/2021 | Zhang | G02B 13/18 |

FOREIGN PATENT DOCUMENTS

| JP | H11-249017 A | 9/1999 |
| JP | H11-271617 A | 10/1999 |

(Continued)

OTHER PUBLICATIONS

Office Action issued in Japanese Patent Application No. 2019-160510, dated May 23, 2023, with English translation (10 pages).

*Primary Examiner* — Stephone B Allen
*Assistant Examiner* — Adam W Booher
(74) *Attorney, Agent, or Firm* — Hamre, Schumann, Mueller & Larson, P.C.

(57) ABSTRACT

There is provided a compact imaging lens configured to properly correct aberrations. The imaging lens includes, in order from an object side to an image side, a first lens L1 with positive refractive power, a second lens L2 with negative refractive power, a third lens L3 with positive refractive power, a fourth lens L4 with negative refractive power, a fifth lens L5, a sixth lens L6, a seventh lens L7 with positive refractive power, and an eighth lens L8 with negative refractive power.

The fourth lens is formed in a shape of a meniscus lens having an object-side surface being concave in a paraxial region. The eighth lens L8 has an aspheric image-side surface having at least one inflection point. Furthermore, the following conditional expression is satisfied:

$$0.04 < D34/f < 0.15$$

where
f: a focal length of the overall optical system of the imaging lens, and (Continued)

Example 1

D34: a distance along the optical axis between the third lens and the fourth lens.

6 Claims, 12 Drawing Sheets

(51) Int. Cl.
*G02B 13/18* (2006.01)
*G02B 9/64* (2006.01)

(56) References Cited

FOREIGN PATENT DOCUMENTS

| | | |
|---|---|---|
| JP | 2000-019399 A | 1/2000 |
| JP | 2017-116594 A | 6/2017 |
| JP | 2021-33300 A | 3/2021 |

\* cited by examiner

Example 1

Example 2

Example 3

Example 4

Example 5

Example 6

IMAGING LENS

BACKGROUND OF THE INVENTION AND RELATED ART STATEMENT

The present invention relates to an imaging lens for forming an image of an object on an image sensor such as a CCD sensor and a CMOS sensor. Particularly, the present invention relates to an imaging lens suitable for mounting in a relatively small camera to be built in portable devices such as cellular phones and portable information terminals, digital still cameras, security cameras, onboard cameras and network cameras, and so on.

To take a picture of an object with high definition or acquire more information on the object, the camera has to have a high-resolution imaging lens as well as an image sensor with high pixel count. As a method for achieving higher resolution of an imaging lens, there is a method of increasing the number of lenses that compose the imaging lens in accordance with the difficulty of correcting aberrations.

A lens configuration including eight lenses has, due to the large number of lenses of the imaging lens, high flexibility in design and thus allows proper correction of aberrations. As the imaging lens having the eight-lens configuration, for example, an imaging lens described in Patent Document 1 has been known.

Patent Document 1 discloses an imaging lens comprising a first lens with positive refractive power having a convex object-side surface, a second lens, a third lens, a fourth lens, a fifth lens, a sixth lens, a seventh lens with negative refractive power, and an eighth lens with the negative refractive power having a concave image-side surface.

Patent Document 1: Japanese Patent Application Publication No. 2017-116594

According to the conventional imaging lens of Patent Document 1, although aberrations can be relatively properly corrected, having a long total track length relative to the focal length of the overall optical system of the imaging lens, such imaging lens is insufficient in downsizing and achieving a low profile for mounting in a small camera to be built in a thin device such as a smartphone. In the case of the conventional imaging lens described in Patent Document 1, it is difficult to achieve more proper aberration correction while further downsizing and achieving a low profile of the imaging lens.

Such a problem is not specific to the imaging lens to be mounted in smartphones. Rather, it is a common problem for imaging lenses to be mounted in such as the cellular phone, the portable information terminal, and the relatively small camera such as the digital still camera, the security camera, the onboard camera, and the network camera or the like.

An object of the present invention is to provide an imaging lens that can achieve both downsizing of the imaging lens and proper correction of aberrations.

SUMMARY OF THE INVENTION

An imaging lens according to the present invention forms an image of an object on an image sensor and comprises, in order from an object side to an image side, a first lens with positive refractive power, a second lens with negative refractive power, a third lens with positive refractive power, a fourth lens with negative refractive power, a fifth lens, a sixth lens, a seventh lens with positive refractive power, and an eighth lens with negative refractive power. The eighth lens has an aspheric image-side surface having at least one inflection point.

In the imaging lens according to the present invention, the second lens with the negative refractive power is arranged on an image side of the first lens with the positive refractive power, and chromatic aberration can be properly corrected while preferably reducing a profile of the imaging lens. Providing the third lens with positive refractive power, an arrangement of refractive powers of the first lens, the second lens and the third lens, respectively is made as "positive", "negative" and "positive", and the chromatic aberration can be properly corrected for wavelengths in a wide range. Furthermore, providing a lens with negative refractive power as the fourth lens, an arrangement of refractive powers of the third lens and the fourth lens is made as "positive" and "negative". Therefore, the chromatic aberration required for higher resolution of an imaging lens can be precisely corrected.

Additionally, in the imaging lens according to the present invention, the eighth lens with the negative refractive power is arranged on an image side of the seventh lens with the positive refractive power. Providing such an arrangement of the refractive powers, axial chromatic aberration and chromatic aberration of magnification can be properly corrected. Furthermore, when the image-side surface of the eighth lens is formed as an aspheric surface having at least one inflection point, a back focus can be secured and field curvature and distortion at an image periphery can be properly corrected. According to such a shape of the eighth lens, it is also possible to control an incident angle of a light ray emitted from the imaging lens to an image plane of the image sensor within the range of chief ray angle (CRA), and to properly correct the aberrations in a paraxial region and at the peripheral area.

Regarding terms used in the present invention, "lens" refers to an optical element having refractive power. Therefore, the term "lens" used herein does not include the optical element such as a prism changing a traveling direction of a light, a flat filter, and the like. Those optical elements may be arranged in front of or behind the imaging lens, or between respective lenses, as necessary.

According to the imaging lens having the above-described configuration, it is preferable that the fourth lens L4 has a shape that curvature radii of an object-side surface and an image-side surface are both negative, that is, a shape of a meniscus lens having the object-side surface being concave in a paraxial region.

When the fourth lens is formed in such a shape, an increase in an incident angle of an upper light ray to the image plane in a higher position of an image height can be suppressed and the field curvature, coma aberration and total reflection light can be properly corrected.

According to the imaging lens having the above-described configuration, it is preferable that the following conditional expression (1) is satisfied:

$$0.04 < D34/f < 0.15 \qquad (1)$$

where f: a focal length of the overall optical system of the imaging lens, and

D34: a distance along the optical axis between the third lens and the fourth lens.

When the conditional expression (1) is satisfied, a wide field of view of the imaging lens can be achieved while securing a clearance between the third lens and the fourth lens. Furthermore, the back focus can be secured.

According to the imaging lens having the above-described configuration, it is preferable that the following conditional expression (2) is satisfied:

$$1.20 < f3/f1 < 5.50 \tag{2}$$

where
f1: a focal length of the first lens, and
f3: a focal length of the third lens.

When the conditional expression (2) is satisfied, spherical aberration and the field curvature can be properly corrected while reducing the profile of the imaging lens.

According to the imaging lens having the above-described configuration, it is preferable that the following conditional expression (3) is satisfied:

$$1.35 < f3/f < 4.50 \tag{3}$$

where
f: a focal length of the overall optical system of the imaging lens, and
f3: a focal length of the third lens.

When the conditional expression (3) is satisfied, the spherical aberration and the field curvature can be properly corrected while reducing the profile of the imaging lens.

According to the imaging lens having the above-described configuration, it is preferable that the following conditional expression (4) is satisfied:

$$-5.50 < f4/f3 < -0.80 \tag{4}$$

where
f3: a focal length of the third lens, and
f4: a focal length of the fourth lens.

When the conditional expression (4) is satisfied, the chromatic aberration can be properly corrected while reducing the profile of the imaging lens.

According to the imaging lens having the above-described configuration, it is preferable that the following conditional expression (5) is satisfied:

$$-12.00 < f4/f < -1.00 \tag{5}$$

where
f: a focal length of the overall optical system of the imaging lens, and
f4: a focal length of the fourth lens.

When the conditional expression (5) is satisfied, the chromatic aberration can be properly corrected while reducing the profile of the imaging lens.

According to the imaging lens having the above-described configuration, it is preferable that the following conditional expression (6) is satisfied:

$$0.02 < D45/D34 < 1.00 \tag{6}$$

where
D34: a distance along the optical axis between the third lens and the fourth lens, and
D45: a distance along the optical axis between the fourth lens and the fifth lens.

When the conditional expression (6) is satisfied, both reducing the profile and the wide field of view of the imaging lens can be preferably achieved.

According to the imaging lens having the above-described configuration, it is preferable that the following conditional expression (7) is satisfied:

$$0.80 < f67/f < 3.50 \tag{7}$$

where
f: a focal length of the overall optical system of the imaging lens, and
f67: a composite focal length of the sixth lens and the seventh lens.

When the conditional expression (7) is satisfied, the spherical aberration and the distortion can be properly corrected while reducing the profile of the imaging lens.

According to the imaging lens having the above-described configuration, it is preferable that the following conditional expression (8) is satisfied:

$$0.80 < f7/f < 3.50 \tag{8}$$

where
f: a focal length of the overall optical system of the imaging lens, and
f7: a focal length of the seventh lens.

When the conditional expression (8) is satisfied, the spherical aberration and the distortion can be properly corrected while reducing the profile of the imaging lens.

According to the imaging lens having the above-described configuration, it is preferable that the seventh lens is formed in a meniscus shale.

When the seventh lens is formed in such a shape, the positive refractive power of the seventh lens is suppressed from being large, and thus the spherical aberration, the field curvature, and distortion can be properly corrected in well balance.

According to the imaging lens having the above-described configuration, it is preferable that the following conditional expression (9) is satisfied:

$$1.00 < R7r/R7f < 3.00 \tag{9}$$

where
R7f: a curvature radius of an object-side surface of the seventh lens, and
R7r: a curvature radius of an image-side surface of the seventh lens.

When the conditional expression (9) is satisfied, uniformity of thickness of a center area and thickness of a peripheral area of the seventh lens can be secured and the field curvature and the distortion can be properly corrected.

According to the imaging lens having the above-described configuration, it is preferable that the following conditional expression (10) is satisfied:

$$0.30 < T7/T8 < 1.50 \tag{10}$$

where
T7: a thickness along the optical axis of the seventh lens, and
T8: a thickness along the optical axis of the eighth lens.

When the profile of the imaging lens is reduced, a lens arranged in a position closer to the image plane tends to have a greater effective diameter. When the conditional expression (10) is satisfied, thicknesses along the optical axis of the seventh lens and the eighth lens that are likely to have relatively large effective diameters are properly maintained. It is thus possible to properly correct aberrations while reducing the profile of the imaging lens. It is also possible to secure the back focus. When the seventh lens and the eighth lens are formed from a plastic material, it is possible to reduce a manufacturing cost of the lenses and also to secure formability of the lenses by satisfying the conditional expression (10).

According to the imaging lens having the above-described configuration, it is preferable that the following conditional expression (11) is satisfied:

$$-1.20 < f8/f7 < -0.35 \tag{11}$$

where f7: a focal length of the seventh lens, and f8: a focal length of the eighth lens.

When the conditional expression (11) is satisfied, the spherical aberration, the field curvature, and Chromatic aberration of magnification can be properly corrected in well balance.

According to the imaging lens having the above-described configuration, it is preferable that the the eighth lens is formed in a shape that a curvature radius of the image-side surface is positive and the image-side surface is concave in the paraxial region.

When the eighth lens is thus formed in such a shape, a position of a principal point is moved toward the object side, and reduction in the profile of the imaging lens can be preferably achieved. Additionally, the back focus can be secured.

According to the imaging lens having the above-described configuration, it is preferable that the following conditional expression (12) is satisfied:

$$0.03 < D78/f < 0.15 \tag{12}$$

where f: a focal length of the overall optical system of the imaging lens,

D78: a distance along the optical axis between the seventh lens and the eighth lens.

When the conditional expression (12) is satisfied, the field curvature and the distortion can be properly corrected while reducing the profile of the imaging lens. Furthermore, the incident angle of a light ray emitted from the imaging lens to the image plane can be preferably controlled to be within the range of chief ray angle (CRA) while securing the back focus.

According to the imaging lens having the above-described configuration, in order to more properly correct the chromatic aberration, it is preferable that the following conditional expressions (13) and (14) are satisfied:

$$35 < vd3 \tag{13}$$

$$35 < vd4 \tag{14}$$

where vd3: an abbe number at d-ray of the third lens, and vd4: an abbe number at d-ray of the fourth lens.

According to the imaging lens having the above-described configuration, it is more preferable that the following conditional expressions (13a) and (14a) are satisfied:

$$35 < vd3 < 90 \tag{13a}$$

$$35 < vd4 < 90 \tag{14a}$$

According to the imaging lens having the above-described configuration, in order to more properly correct the axial chromatic aberration and the chromatic aberration of magnification, it is preferable that the following conditional expressions (15) and (16) are satisfied:

$$35 < vd7 \tag{15}$$

$$35 < vd8 \tag{16}$$

where vd7: an abbe number at d-ray of the seventh lens, and vd8: an abbe number at d-ray of the eighth lens.

According to the imaging lens having the above-described configuration, it is more preferable that the following conditional expressions (15a) and (16a) are satisfied:

$$35 < vd7 < 90 \tag{15a}$$

$$35 < vd8 < 90 \tag{16a}$$

According to the imaging lens having the above-described configuration, it is preferable that the following conditional expression (17) is satisfied:

$$TL/f < 1.2 \tag{17}$$

where f: a focal length of the overall optical system of the imaging lens, and

TL: a distance along the optical axis from an object-side surface of the first lens to an image plane.

When the conditional expression (17) is satisfied, downsizing the imaging lens can be preferably achieved.

Generally, an IR cut filter, a cover glass or the like are arranged between the imaging lens and the image plane, however a distance thereof along the optical axis is converted into an air-converted distance in the present specification.

In the case of an imaging lens to be built in a thin portable device, such as the smartphone, the imaging lens has to be accommodated in a limited space. Therefore, there is often a strict limitation in a length of the imaging lens in the direction of the optical axis relative to the size of the image sensor. That is, reduction in the profile of the imaging lens is strongly expected. Therefore, the imaging lens according to the present invention preferably satisfies the following conditional expression (18):

$$1.00 < TL/H \max < 1.80 \tag{18}$$

where

TL: a distance along the optical axis from an object-side surface of the first lens to an image plane, and Hmax: a maximum image height.

According to the imaging lens of the present invention, it is preferable that each lens of the first to the eighth lenses is arranged with an air gap. When each lens is arranged with an air gap, the imaging lens according to the present invention has a lens configuration without a cemented lens. According to such a lens configuration, all of eight lenses composing the imaging lens can be formed from a plastic material and the manufacturing cost of the imaging lens can be preferably reduced.

According to the imaging lens of the present invention, it is preferable that both surfaces of each lens of the first to the eighth lenses are formed as aspheric surfaces. When the both surfaces of each lens are formed as aspheric surfaces, aberrations from a paraxial region to a peripheral area of the lens can be more properly corrected. Particularly, the aberrations at the peripheral area of the lens can be properly corrected.

According to the imaging lens having the above-described configuration, it is preferable that at least two surfaces of the seventh lens and the eighth lens are formed as the aspheric surfaces having at least one inflection point. In addition to the image-side surface of the eighth lens, when one more aspheric surface having at least one inflection point is provided, it is also possible to more preferably control an incident angle of a light ray emitted from the imaging lens to the image plane within the range of chief ray angle (CRA), and to more properly correct the aberrations at an image periphery.

According to the imaging lens of the present invention, when a field of view is shown as 2ω, it is preferable that a conditional expression, 65°≤2ω is satisfied. When this conditional expression is satisfied, a wide field of view of the imaging lens can be achieved, and both downsizing and the wide field of view of the imaging lens can be preferably achieved.

According to the present invention, as described above, the shapes of the lenses are specified using signs of the curvature radii. Whether the curvature radius of the lens is positive or negative is determined based on general definition. More specifically, taking a traveling direction of the light as positive, if a center of a curvature radius is on the image side when viewed from a lens surface, the curvature radius is positive. If a center of a curvature radius is on the object side, the curvature radius is negative. Therefore, "an object-side surface having a positive curvature radius" means that the object-side surface is a convex surface. "An object-side surface having a negative curvature radius" means that the object side surface is a concave surface. In addition, "an image-side surface having a positive curvature radius" means that the image-side surface is a concave surface. "An image-side surface having a negative curvature radius" means that the image-side surface is a convex surface. Here, a curvature radius used herein refers to a paraxial curvature radius, and may not be consistent with general shapes of the lenses in their sectional views.

According to the imaging lens of the present invention, it is achievable to provide a compact imaging lens especially suitable for mounting in a small-sized camera, while having high resolution with proper correction of aberrations.

DETAILED DESCRIPTION OF EMBODIMENTS

Hereunder, referring to the accompanying drawings, an embodiment of the present invention will be fully described.

FIGS. 1, 4, 7, 10, 13 and 16 are schematic sectional views of the imaging lenses in Examples 1 to 6 according to the embodiment, respectively. Since the imaging lenses in those Examples have the same basic configuration, the imaging lens of the present embodiment will be described with reference to the illustrative sectional view of Example 1.

Figure 1:
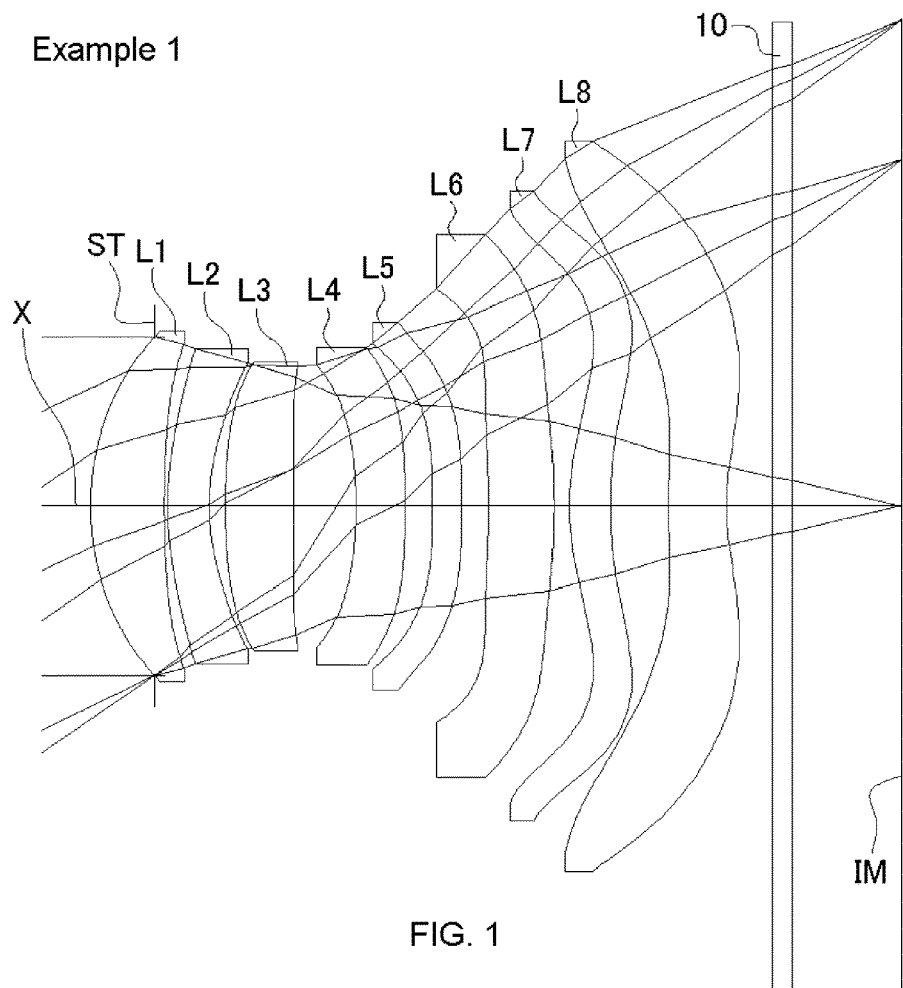
FIG. 1 is a sectional view of a schematic configuration of an imaging lens in Example 1 of the present invention.

As shown in FIG. 1, the imaging lens according to the present embodiment comprises, in order from an object side to an image side, a first lens L1 with positive refractive power, a second lens L2 with negative refractive power, a third lens L3 with positive refractive power, a fourth lens L4 with negative refractive power, a fifth lens L5, a sixth lens L6, a seventh lens L7 with positive refractive power and an eighth lens L8 with negative refractive power. Each lens of the first lens L1 to the eighth lens L8 is arranged with an air gap. A filter 10 is arranged between the eighth lens L8 and an image plane IM of an image sensor. The filter 10 is omissible.

The first lens L1 has a shape that a curvature radius r2 of an object-side surface and a curvature radius r3 of an image-side surface are both positive. The first lens L1 is formed in a shape of a meniscus lens having the object-side surface being convex in a paraxial region. The shape of the first lens L1 is not limited to the one in the Example 1. The shape of the first lens L1 may be formed in any shape, as long as refractive power of the first lens L1 is positive. The first lens L1 may be formed in a shape that the curvature radii r2 and r3 are both negative or a shape that the curvature radius r2 is positive and the curvature radius r3 is negative. The lens having the former shape is the meniscus lens having the object-side surface being concave in the paraxial region, and the lens having the latter shape is a biconvex lens in the paraxial region. It is preferable that the curvature radius r2 is positive from the standpoint of downsizing the imaging lens.

In the Example 1, an aperture stop ST is disposed on the object side of the first lens L1. A location of the aperture stop ST is not limited to the one in the Example 1. The aperture stop ST may be disposed between the first lens L1 and the second lens L2, between the second lens L2 and the third lens L3, between the third lens L3 and the fourth lens L4, between the fourth lens L4 and the fifth lens L5 or the like.

The second lens L2 has a shape that a curvature radius r4 of an object-side surface and a curvature radius r5 of an image-side surface are both positive. The second lens L2 is formed in a shape of a meniscus lens having the object-side surface being convex in a paraxial region. The shape of the second lens L2 is not limited to the one in the Example 1. The shape of the second lens L2 may be formed in any shape, as long as refractive power of the second lens L2 is negative. The second lens L2 may be formed in a shape that the curvature radii r4 and r5 are negative, that is, a shape of the meniscus lens having the object-side surface being concave in the paraxial region. Otherwise, the second lens L2 may be formed in a shape that the curvature radius r4 is negative and the curvature radius r5 is positive, that is, a biconcave shape in the paraxial region. It is preferable that the curvature radius r4 of the second lens L2 is positive from the standpoint of downsizing the imaging lens.

The third lens L3 has a shape that a curvature radius r6 of an object-side surface is positive and a curvature radius r7 of an image-side surface is negative. The third lens L3 is formed in a biconvex shape in a paraxial region. The shape of the third lens L3 is not limited to the one in the Example 1. The shape of the third lens L3 may be formed in any shape, as long as refractive power of the third lens L3 is positive. Examples 3 to 5 show a shape that the curvature radii r6 and r7 are both positive, that is, a shape of the meniscus lens having the object-side surface being convex in the paraxial region. Other than such shapes, the third lens L3 may be formed in a shape that the curvature radii r6 and r7 are both negative, that is, a shape of the meniscus lens having the object-side surface being concave in the paraxial region. It is preferable that the curvature radius r6 of the third lens L3 is positive from the standpoint of downsizing the imaging lens.

The fourth lens L4 is formed in a shape that a curvature radius r8 of an object-side surface and a curvature radius r9 of an image-side surface are both negative. The fourth lens L4 is formed in a shape of the meniscus lens having the object-side surface being concave in a paraxial region. In addition, the fourth lens L4 is formed in a shape having a concave surface facing the third lens L3 at a peripheral area of the lens. Therefore, the field curvature and astigmatism can be properly corrected.

The shape of the fourth lens L4 is not limited to the one in the Example 1. The shape of the fourth lens L4 may be formed in any shape, as long as refractive power of the fourth lens L4 is negative. The shape of the fourth lens L4 may be formed in a shape that the curvature radius r8 is negative and the curvature radius r9 is positive, that is, a biconcave shape in the paraxial region. Otherwise, the shape of the fourth lens L4 may be formed in a shape that the curvature radii r8 and r9 are both positive, that is, a shape of the meniscus lens having the object-side surface being convex in the paraxial region.

The fifth lens L5 has positive refractive power. The refractive power of the fifth lens L5 is not limited to being positive. Examples of the lens configuration that the refractive power of the fifth lens L5 is negative are shown in Examples 3, 4 and 6. In addition, an example of the fifth lens L5 which the refractive power becomes zero in a paraxial region is shown in the Example 5.

The fifth lens L5 is formed in a shape that a curvature radius r10 of an object-side surface and a curvature radius r11 of an image-side surface are both negative. The fifth lens L5 is formed in shape of the meniscus lens having the object-side surface being concave in a paraxial region. Furthermore, the shape of the fifth lens L5 is not limited to the one in the Example 1. The fifth lens L5 may be formed in a shape that the curvature radius r10 is negative and the curvature radius r11 is positive, that is, a shape of the biconcave lens in the paraxial region. Other than such shapes, the fifth lens L5 is formed in a shape that the curvature radii r10 and r11 are both positive, or a shape that the curvature radius r10 is positive and the curvature radius r11 is negative.

The lens having the former shape is the meniscus lens having the object-side surface being convex in the paraxial region, and the lens having the latter shape is the biconvex lens in the paraxial region. On the other hand, the Example 5 shows a shape that the curvature radii r10 and r11 of infinity in the paraxial region. The fifth lens L5 having such a shape has no refractive power in the paraxial region but has the refractive power at a peripheral area of the lens. Such a fifth lens L5 is suitable for correction of the aberrations at the peripheral area of the lens.

The sixth lens L6 has positive refractive power. The refractive power of the sixth lens L6 is not limited to being positive. Examples of the lens configuration that the refractive power of the sixth lens L6 is negative are shown in Examples 2, 4 and 5. Example 6 shows an example that the refractive power of the sixth lens L6 becomes zero in a paraxial region.

The sixth lens L6 is formed in a shape that a curvature radius r12 of an object-side surface and a curvature radius r13 of an image-side surface are both negative. The sixth lens L6 is formed in a shape of a meniscus lens having the object-side surface being concave in a paraxial region. In addition, the shape of the sixth lens L6 is not limited to the one in the Example 1. Other than the shape of the Example 1, the sixth lens L6 may be formed in a shape that the curvature radii r12 and r13 are both positive, or a shape that the curvature radius r12 is positive and the curvature radius r13 is negative. The lens having the former shape is a meniscus lens having a convex object-side surface in the paraxial region, and the lens having the latter shape is a biconvex lens in the paraxial region. Furthermore, the sixth lens L6 may be formed in a shape that the curvature radius r12 is negative and the curvature radius r13 is positive, that is, a shape of a biconcave lens in the paraxial region. Example 6 shows an example that both curvature radii r12 and r13 are infinity in the paraxial region. The sixth lens L6 having such a shape has no refractive power in the paraxial region but has the refractive power at a peripheral area of the lens. Such a sixth lens L6 is suitable for correction of the aberrations at the peripheral area of the lens.

The seventh lens L7 is formed in a shape that a curvature radius r14 (=R7$f$) of an object-side surface and a curvature radius r15 (=R7$r$) of an image-side surface are both positive. The seventh lens L7 is formed in a shape of a meniscus lens having the object-side surface being convex in a paraxial region. The shape of the seventh lens L7 is not limited to the one in the Example 1. The seventh lens L7 may be formed in a shape that the curvature radii r14 and r15 are both negative, that is, a shape of the meniscus lens having the object-side surface being concave in the paraxial region. Other than such shape, the seventh lens L7 may be formed in a shape that the curvature radius 14 is positive and the curvature radius 15 is negative, that is, a shape of the biconvex lens in the paraxial region. In short, the shape of the seventh lens L7 may be the one that refractive power of the seventh lens L7 is positive.

The eighth lens L8 is formed in a shape that a curvature radius r16 of an object-side surface and a curvature radius r17 of an image-side surface are both positive. The eighth lens L8 is formed in a shape of the meniscus lens having the object-side surface being convex in a paraxial region. The shape of the eighth lens L8 is not limited to the one in the Example 1. Example 2 shows a shape that the curvature radius r16 is negative and the curvature radius r17 is positive, that is, an example of the biconcave lens in the paraxial region. Other thank such shape, the eighth lens L8 may be formed in a shape that the curvature radii r16 and r17 are both negative, that is, a shape of the meniscus lens having the object-side surface being concave. In short, the shape of the eighth lens L8 may be the one that refractive power of the eighth lens L8 is negative. It is preferable that the eighth lens L8 is formed in a shape that the curvature radius r17 is positive from the standpoint of reducing the profile and securing the back focus.

Regarding the eighth lens L8, the image-side surface is formed as an aspheric surface having at least one inflection point. Here, the "inflection point" means a point where the positive/negative sign of a curvature changes on the curve, i.e., a point where a direction of curving of the curve on the lens surface changes. The image-side surface of the eighth lens L8 of the imaging lens according to the present embodiment is the aspheric surface having at least one pole. With such shape of the eighth lens L8, off-axial chromatic aberration of magnification as well as axial chromatic aberration can be properly corrected, and an incident angle of a light ray emitted from the imaging lens to the image plane IM can be preferably controlled within the range of chief ray angle (CRA). According to the imaging lens of the present embodiment, both surfaces of the seventh lens L7 and the eighth lens L8 are aspheric surfaces having at least one pole. Therefore, aberrations at an image periphery can be properly corrected. Depending on the required optical performance and extent of downsizing of the imaging lens, among lens surfaces of the seventh lens L7 and the eighth lens L8, lens surfaces other than the image-side surface of the eighth lens L8 may be formed as an aspheric surface without the inflection point.

According to the embodiment, the imaging lens satisfies the following conditional expressions (1) to (18):

$$0.04 < D34/f < 0.15 \tag{1}$$

$$1.20 < f3/f1 < 5.50 \tag{2}$$

$$1.35 < f3/f < 4.50 \tag{3}$$

$$-5.50 < f4/f3 < -0.80 \tag{4}$$

$$-12.00 < f4/f < -1.00 \tag{5}$$

$$0.02 < D45/D34 < 1.00 \tag{6}$$

$$0.80 < f7/f < 3.50 \tag{7}$$

$$0.80 < f7/f < 3.50 \tag{8}$$

$$1.00 < R7r/R7f < 3.00 \tag{9}$$

$$0.30 < T7/T8 < 1.50 \tag{10}$$

$$-1.20 < f8/f7 < -0.35 \tag{11}$$

$$0.03 < D78/f < 0.15 \tag{12}$$

$$35 < vd3 \tag{13}$$

$$35 < vd4 \tag{14}$$

$$35 < vd3 < 90 \tag{13a}$$

$$35 < vd4 < 90 \tag{14a}$$

$$35 < vd7 \tag{15}$$

$$35 < vd8 \tag{16}$$

$$35 < vd7 < 90 \tag{15a}$$

$$35 < vd8 < 90 \tag{16a}$$

$$TL/f < 1.2 \tag{17}$$

$$1.00 < TL/Hmax < 1.80 \tag{18}$$

where
f: a focal length of the overall optical system of the imaging lens,
f1: a focal length of the first lens L1,
f3: a focal length of the third lens L3,
f4: a focal length of the fourth lens L4,
f7: a focal length of the seventh lens L7,
f8: a focal length of the eighth lens L8,
f67: a composite focal length of the sixth lens L6 and the seventh lens L7,
T7: a thickness along the optical axis X of the seventh lens L7,
T8: a thickness along the optical axis X of the eighth lens L8,
vd3: an abbe number at d-ray of the third lens L3,
vd4: an abbe number at d-ray of the fourth lens L4,
vd7: an abbe number at d-ray of the seventh lens L7,
vd8: an abbe number at d-ray of the eighth lens L8,
R7f: a curvature radius of an object-side surface of the seventh lens L7,
R7r: a curvature radius of an image-side surface of the seventh lens L7,
R8r: a curvature radius of an image-side surface of the eighth lens L8,
D34: a distance along the optical axis X between the third lens L3 and the fourth lens L4,
D45: a distance along the optical axis X between the fourth lens L4 and the fifth lens L5,
D78: a distance along the optical axis X between the seventh lens L7 and the eighth lens L8,
Hmax: a maximum image height, and
TL: a distance along the optical axis X from an object-side surface of the first lens L1 to an image plane IM (Filter 10 is an air-converted distance).

The imaging lens according to the present embodiment satisfies the following conditional expression:

$$65° \le 2\omega.$$

It is not necessary to satisfy the above all conditional expressions, and when any one of the conditional expressions is individually satisfied, operational advantage corresponding to each conditional expression can be obtained.

According to the present embodiment, lens surfaces of the respective lenses are formed as aspheric surfaces. An equation that expresses these aspheric surfaces is shown below:

$$Z = \frac{C \cdot H^2}{1 + \sqrt{1-(1+k) \cdot C^2 \cdot H^2}} + \Sigma(An \cdot H^n) \qquad [\text{Equation 1}]$$

where
Z: a distance in a direction of the optical axis,
H: a distance from the optical axis in a direction perpendicular to the optical axis,
C: a paraxial curvature (=1/r, r: a paraxial curvature radius),
k: conic constant, and
An: the nth aspheric coefficient.

Next, examples of the imaging lens according to the present embodiment will be described. In each example, f represents a focal length of the overall optical system of the imaging lens, Fno represents an F-number, ω represents a half field of view. Additionally, i represents a surface number counted from the object side, r represents a paraxial curvature radius, d represents a distance of lenses along the optical axis (surface distance), nd represents a refractive index at a reference wavelength of 588 nm, and νd represents an abbe number at the reference wavelength, respectively. Here, surfaces indicated with surface numbers i affixed with an asterisk (*) are aspheric surfaces.

EXAMPLE 1

The basic lens data is shown below in Table 1.

TABLE 1

| f = 7.34 mm Fno = 2.1 ω = 34.6° | | | | | | |
|---|---|---|---|---|---|---|
| | i | r | d | n d | ν d | [mm] |
| ST | 1 | ∞ | ∞ −0.645 | | | |
| L1 | 2* | 2.758 | 0.746 | 1.5445 | 56.4 | f1 = 6.226 |
| | 3* | 13.386 | 0.035 | | | |
| L2 | 4* | 3.564 | 0.422 | 1.6707 | 19.2 | f2 = −12.198 |
| | 5* | 2.365 | 0.161 | | | |

TABLE 1-continued

| f = 7.34 mm Fno = 2.1 ω = 34.6° | | | | | | |
|---|---|---|---|---|---|---|
| | i | r | d | n d | ν d | [mm] |
| L3 | 6* | 6.954 | 0.681 | 1.5445 | 56.4 | f3 = 12.300 |
| | 7* | −175.138 | 0.637 | | | |
| L4 | 8* | −5.115 | 0.496 | 1.5445 | 56.4 | f4 = −13.752 |
| | 9* | −16.698 | 0.278 | | | |
| L5 | 10* | −28.943 | 0.295 | 1.6707 | 19.2 | f5 = 106.528 |
| | 11* | −20.683 | 0.272 | | | |

TABLE 1-continued

| f = 7.34 mm Fno = 2.1 ω = 34.6° | | | | | | |
|---|---|---|---|---|---|---|
| | i | r | d | n d | ν d | [mm] |
| L6 | 12* | −9.069 | 0.660 | 1.6142 | 25.6 | f6 = 101.094 |
| | 13* | −8.132 | 0.153 | | | |
| L7 | 14* | 2.885 | 0.418 | 1.5348 | 55.7 | f7 = 12.100 |
| | 15* | 4.942 | 0.585 | | | |
| L8 | 16* | 6.976 | 0.587 | 1.5348 | 55.7 | f8 = −7.459 |
| | 17* | 2.464 | 0.462 | | | |
| | 18 | ∞ | 0.210 | 1.5168 | 64.2 | |
| | 19 | ∞ | 1.097 | | | |
| (IM) | | ∞ | | | | | f67 = 10.527 mm
R7f = 2.885 mm
R7r = 4.942 mm
D34 = 0.637 mm
D45 = 0.278 mm
D78 = 0.585 mm
T7 = 0.418 mm
T8 = 0.587 mm
TL = 8.125 mm
Hmax = 5.1 mm

TABLE 2

Aspheric Surface Data

| i | k | A4 | A6 | A8 | A10 |
|---|---|---|---|---|---|
| 2 | −5.374E−01 | 1.252E−02 | −1.657E−02 | 2.779E−02 | −2.677E−02 |
| 3 | 0.000E+00 | 3.354E−02 | −8.001E−02 | 1.485E−01 | −1.701E−01 |
| 4 | −1.167E+00 | 6.104E−03 | −8.641E−02 | 1.655E−01 | −1.932E−01 |
| 5 | −1.894E+00 | −1.279E−02 | 1.080E−02 | −4.512E−02 | 9.158E−02 |
| 6 | 0.000E+00 | 2.625E−02 | −3.465E−02 | 8.812E−02 | −1.216E−01 |
| 7 | 0.000E+00 | 2.975E−03 | 1.392E−02 | −2.535E−02 | 3.717E−02 |
| 8 | 0.000E+00 | −6.270E−02 | 8.163E−02 | −1.625E−01 | 1.937E−01 |
| 9 | 0.000E+00 | −6.532E−02 | −6.328E−04 | 5.819E−02 | −1.110E−01 |
| 10 | 0.000E+00 | −1.720E−01 | 1.742E−01 | −2.071E−01 | 1.760E−01 |
| 11 | 0.000E+00 | −1.229E−01 | 1.099E−01 | −9.309E−02 | 4.876E−02 |
| 12 | 0.000E+00 | 2.126E−02 | 2.509E−02 | −3.290E−02 | 1.740E−02 |
| 13 | 0.000E+00 | −1.142E−02 | 2.073E−02 | −7.364E−03 | 3.137E−04 |
| 14 | −1.627E+00 | −2.605E−02 | 4.897E−03 | −5.294E−03 | 2.051E−03 |
| 15 | 0.000E+00 | 1.536E−02 | −1.454E−02 | 2.111E−03 | 9.122E−05 |
| 16 | 7.764E−01 | −1.047E−01 | 3.531E−02 | −7.632E−03 | 1.042E−03 |
| 17 | −1.026E+01 | −5.469E−02 | 1.502E−02 | −3.241E−03 | 4.805E−04 |

| i | A12 | A14 | A16 | A18 | A20 |
|---|---|---|---|---|---|
| 2 | 1.611E−02 | −5.909E−03 | 1.240E−03 | −1.245E−04 | 2.919E−06 |
| 3 | 1.274E−01 | −6.200E−02 | 1.886E−02 | −3.248E−03 | 2.402E−04 |
| 4 | 1.471E−01 | −7.271E−02 | 2.246E−02 | −3.930E−03 | 2.964E−04 |
| 5 | −1.001E−01 | 6.507E−02 | −2.508E−02 | 5.285E−03 | −4.670E−04 |
| 6 | 1.073E−01 | −6.004E−02 | 2.074E−02 | −4.063E−03 | 3.491E−04 |
| 7 | −3.283E−02 | 1.767E−02 | −5.529E−03 | 8.876E−04 | −5.508E−05 |
| 8 | −1.474E−01 | 7.108E−02 | −2.083E−02 | 3.341E−03 | −2.239E−04 |
| 9 | 1.085E−01 | −6.300E−02 | 2.197E−02 | −4.244E−03 | 3.486E−04 |
| 10 | −1.020E−01 | 3.900E−02 | −9.353E−03 | 1.287E−03 | −7.982E−05 |
| 11 | −1.549E−02 | 2.705E−03 | −1.501E−04 | −2.235E−05 | 2.913E−06 |
| 12 | −5.880E−03 | 1.307E−03 | −1.845E−04 | 1.477E−05 | −4.988E−07 |
| 13 | 3.790E−04 | −1.105E−04 | 1.447E−05 | −9.526E−07 | 2.538E−08 |
| 14 | −4.222E−04 | 4.948E−05 | −3.204E−06 | 1.040E−07 | −1.274E−09 |
| 15 | −8.364E−05 | 1.326E−05 | −1.006E−06 | 3.833E−08 | −5.774E−10 |
| 16 | −8.978E−05 | 4.886E−06 | −1.636E−07 | 3.088E−09 | −2.481E−11 |
| 17 | −4.657E−05 | 2.851E−06 | −1.061E−07 | 2.189E−09 | −1.855E−11 |

The values of the respective conditional expressions are as follows:

D34/f=0.09
f3/f1=1.98
f3/f=1.67
f4/f3=−1.12
f4/f=−1.87
D45/D34=0.44
f67/f=1.43
f7/f=1.65

R7r/R7f=1.71
T7/T8=0.71
f8/f7=−0.62
D78/f=0.08
TL/f=1.11
TL/Hmax=1.60

Accordingly, the imaging lens according to the Example 1 satisfies the above-described conditional expressions.

Figure 2:
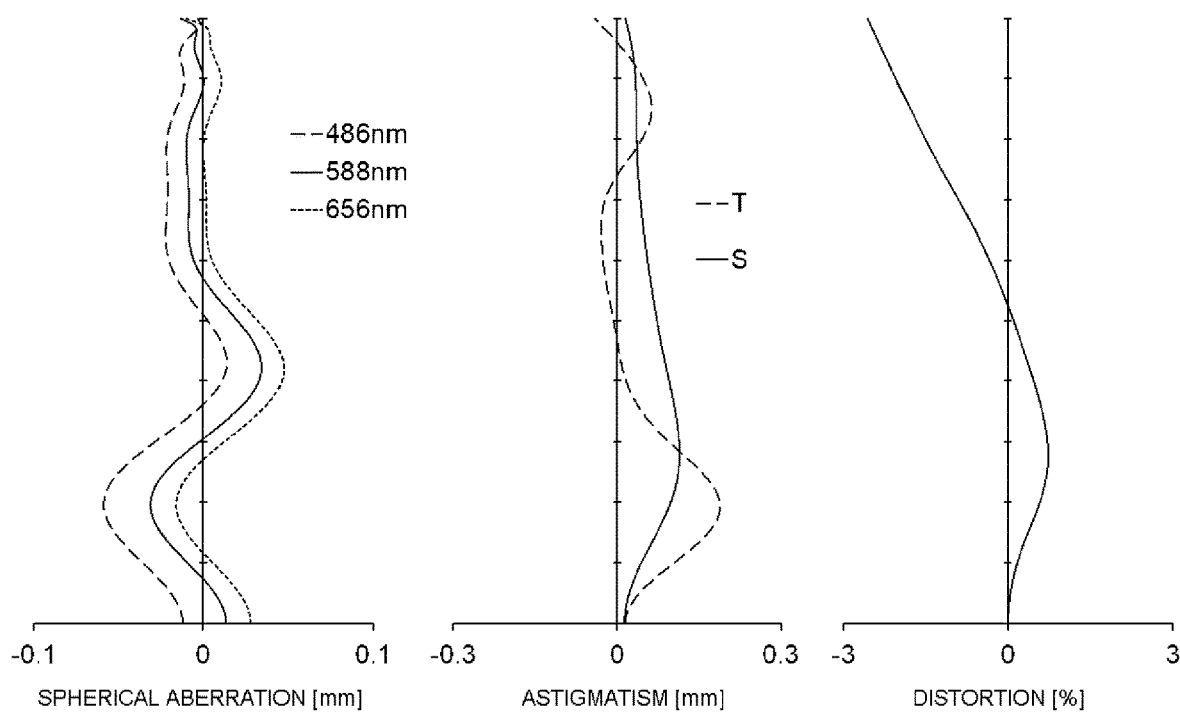
FIG. 2 is an aberration diagram showing spherical aberration, astigmatism, and distortion of the imaging lens of FIG. 1.
Figure 3:
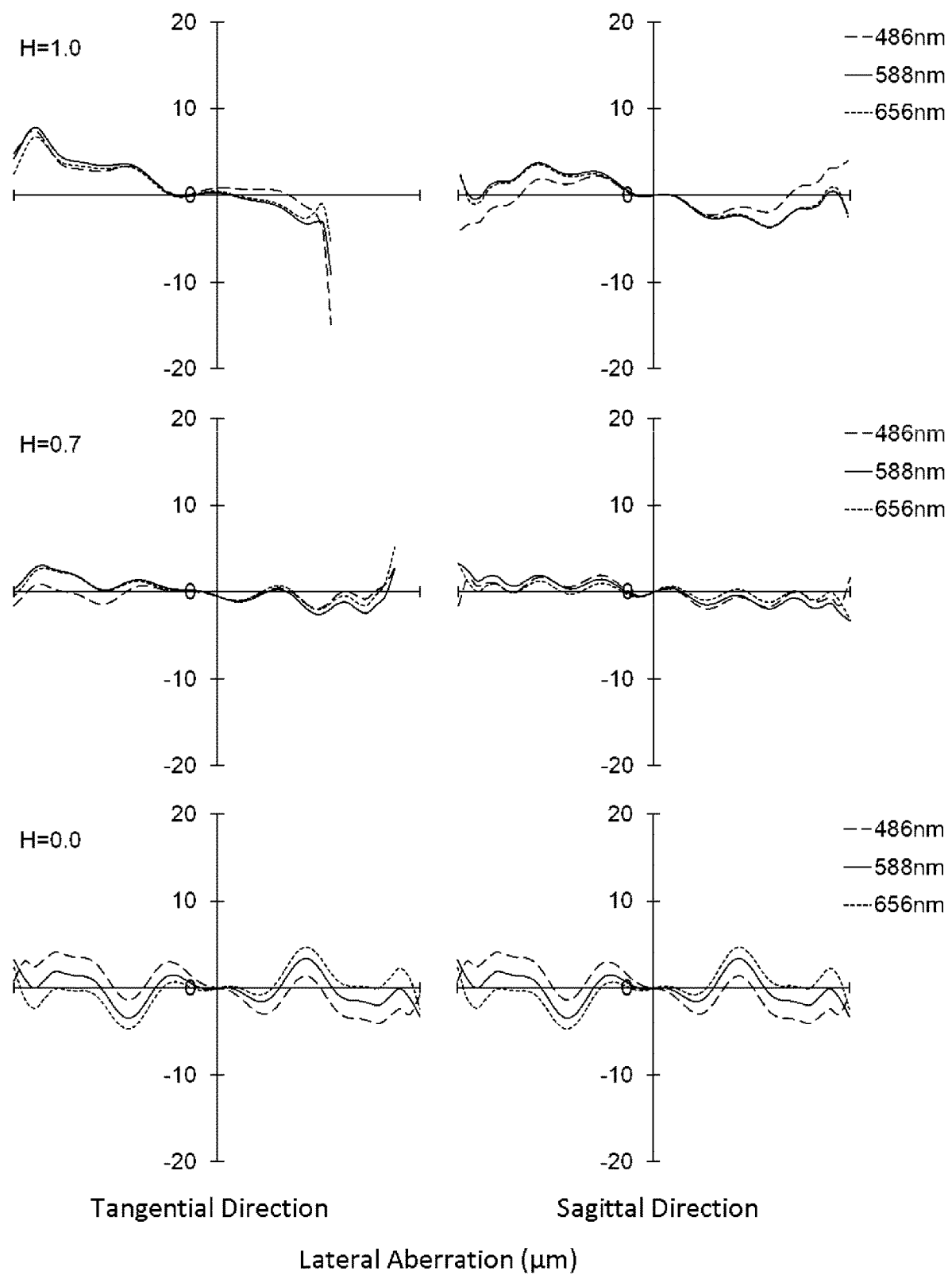
FIG. 3 is an aberration diagram showing a lateral aberration of the imaging lens of FIG. 1.
Figure 4:
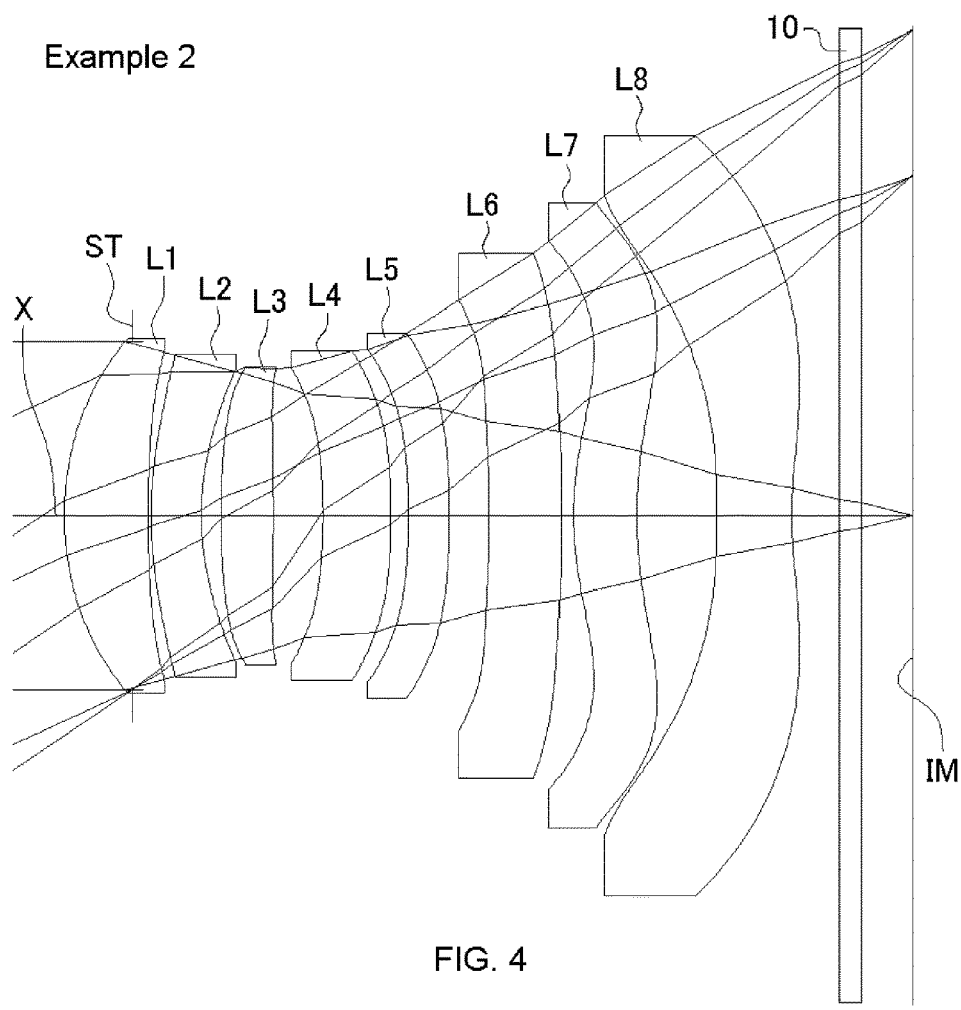
FIG. 4 is a sectional view of a schematic configuration of an imaging lens in Example 2 of the present invention.

FIG. 2 shows spherical aberration (mm), astigmatism (mm), and distortion (%) of the imaging lens in Example 1, respectively. The astigmatism diagram and distortion diagram show aberrations at the reference wavelength (588 nm). Furthermore, in the astigmatism diagram, a sagittal image surface (S) and a tangential image surface (T) are shown respectively (same for FIGS. 5, 8, 11, 14 and 17). FIG. 3 shows a lateral aberration corresponding to a ratio H of each image height to the maximum image height Hmax (hereinafter referred to as "image height ratio H"), which is divided into a tangential direction and a sagittal direction (same for FIGS. 6, 9, 12, 15 and 18). As shown in FIGS. 2 and 3, according to the imaging lens of the Example 1, aberrations can be properly corrected.

EXAMPLE 2

The basic lens data is shown below in Table 3.

TABLE 3

| | i | r | d | n d | ν d | [mm] |
|---|---|---|---|---|---|---|
| | | | $f = 6.91$ mm Fno = 2.1 ω = 33.7° | | | |
| ST | 1 | ∞ | ∞ | | | |
| | | | −0.645 | | | |

TABLE 3-continued

| | i | r | d | n d | ν d | [mm] |
|---|---|---|---|---|---|---|
| | | | $f = 6.91$ mm Fno = 2.1 ω = 33.7° | | | |
| L1 | 2* | 2.767 | 0.795 | 1.5445 | 56.4 | f1 = 6.198 |
| | 3* | 13.825 | 0.028 | | | |
| L2 | 4* | 4.052 | 0.475 | 1.6707 | 19.2 | f2 = −11.801 |
| | 5* | 2.554 | 0.187 | | | |
| L3 | 6* | 7.994 | 0.496 | 1.5445 | 56.4 | f3 = 11.550 |
| | 7* | −28.836 | 0.466 | | | |
| L4 | 8* | −6.006 | 0.643 | 1.5445 | 56.4 | f4 = −42.743 |
| | 9* | −8.400 | 0.164 | | | |
| L5 | 10* | −12.633 | 0.390 | 1.6707 | 19.2 | f5 = 101.130 |
| | 11* | −10.782 | 0.379 | | | |
| L6 | 12* | −10.980 | 0.685 | 1.6142 | 25.6 | f6 = −39.151 |
| | 13* | −20.686 | 0.106 | | | |
| L7 | 14* | 2.989 | 0.602 | 1.5348 | 55.7 | f7 = 13.910 |
| | 15* | 4.646 | 0.756 | | | |
| L8 | 16* | −16.886 | 0.714 | 1.5348 | 55.7 | f8 = −6.118 |
| | 17* | 4.118 | 0.442 | | | |
| | 18 | ∞ | 0.210 | 1.5168 | 64.2 | |
| | 19 | ∞ | 0.494 | | | |
| (IM) | | ∞ | | | | | f67 = 21.232 mm
R7f = 2.989 mm
R7r = 4.646 mm
D34 = 0.466 mm
D45 = 0.164 mm
D78 = 0.756 mm
T7 = 0.602 mm
T8 = 0.714 mm
TL = 7.962 mm
Hmax = 4.6 mm

TABLE 4

| Aspheric Surface Data | | | | | |
|---|---|---|---|---|---|
| i | k | A4 | A6 | A8 | A10 |
| 2 | −6.388E−01 | 1.003E−02 | −1.073E−02 | 2.043E−02 | −2.147E−02 |
| 3 | 0.000E+00 | 3.388E−02 | −7.991E−02 | 1.481E−01 | −1.706E−01 |
| 4 | −7.721E−01 | 9.396E−03 | −8.298E−02 | 1.607E−01 | −1.907E−01 |
| 5 | −2.234E+00 | −1.071E−02 | 1.131E−02 | −4.511E−02 | 9.025E−02 |
| 6 | 0.000E+00 | 1.658E−02 | −2.473E−02 | 6.945E−02 | −9.819E−02 |
| 7 | 0.000E+00 | −1.233E−03 | 1.259E−02 | −1.969E−02 | 3.440E−02 |
| 8 | 0.000E+00 | −4.436E−02 | 4.337E−02 | −1.009E−01 | 1.440E−01 |
| 9 | 0.000E+00 | −7.505E−02 | 2.311E−02 | 4.200E−02 | −1.034E−01 |
| 10 | 0.000E+00 | −1.263E−01 | 1.558E−01 | −1.850E−01 | 1.555E−01 |
| 11 | 0.000E+00 | −7.724E−02 | 9.313E−02 | −8.937E−02 | 4.942E−02 |
| 12 | 0.000E+00 | −1.152E−04 | 3.297E−02 | −3.424E−02 | 1.689E−02 |
| 13 | 0.000E+00 | −1.851E−02 | 1.865E−02 | −6.673E−03 | 3.899E−04 |
| 14 | −1.545E+00 | −3.884E−02 | 7.929E−03 | −5.476E−03 | 2.053E−03 |
| 15 | 0.000E+00 | −4.668E−04 | −8.391E−03 | 1.060E−03 | 1.615E−04 |
| 16 | 0.000E+00 | −6.833E−02 | 2.878E−02 | −7.224E−03 | 1.053E−03 |
| 17 | −2.290E+01 | −4.111E−02 | 1.276E−02 | −2.995E−03 | 4.626E−04 |

| i | A12 | A14 | A16 | A18 | A20 |
|---|---|---|---|---|---|
| 2 | 1.409E−02 | −5.720E−03 | 1.383E−03 | −1.783E−04 | 8.803E−06 |
| 3 | 1.278E−01 | −6.207E−02 | 1.882E−02 | −3.232E−03 | 2.391E−04 |
| 4 | 1.463E−01 | −7.268E−02 | 2.253E−02 | −3.957E−03 | 2.998E−04 |
| 5 | −9.848E−02 | 6.448E−02 | −2.527E−02 | 5.435E−03 | −4.881E−04 |
| 6 | 9.412E−02 | −5.773E−02 | 2.173E−02 | −4.608E−03 | 4.290E−04 |
| 7 | −3.239E−02 | 1.780E−02 | −5.514E−03 | 8.698E−04 | −4.935E−05 |
| 8 | −1.291E−01 | 7.170E−02 | −2.380E−02 | 4.280E−03 | −3.129E−04 |
| 9 | 1.065E−01 | −6.293E−02 | 2.219E−02 | −4.349E−03 | 3.638E−04 |
| 10 | −9.316E−02 | 3.841E−02 | −1.007E−02 | 1.490E−03 | −9.585E−05 |
| 11 | −1.645E−02 | 2.923E−03 | −5.020E−05 | −7.374E−05 | 8.875E−06 |
| 12 | −5.606E−03 | 1.300E−03 | −1.927E−04 | 1.543E−05 | −4.679E−07 |
| 13 | 3.525E−04 | −1.098E−04 | 1.470E−05 | −9.742E−07 | 2.611E−08 |
| 14 | −4.192E−04 | 4.940E−05 | −3.249E−06 | 9.983E−08 | −5.957E−10 |
| 15 | −8.017E−05 | 1.279E−05 | −1.028E−06 | 4.179E−08 | −6.702E−10 |

TABLE 4-continued

| Aspheric Surface Data | | | | |
|---|---|---|---|---|
| 16 | −9.082E−05 | 4.827E−06 | −1.631E−07 | 3.380E−09 | −2.710E−11 |
| 17 | −4.618E−05 | 2.941E−06 | −1.146E−07 | 2.395E−09 | −1.760E−11 |

The values of the respective conditional expressions are as follows:
D34/f=0.07
f3/f1=1.86
f3/f=1.67
f4/f3=−3.70
f4/f=−6.19
D45/D34=0.35
f67/f=3.07
f7/f=2.01
R7r/R7f=1.55
T7/T8=0.84
f8/f7=−0.44
D78/f=0.11
TL/f=1.15
TL/Hmax=1.73

Accordingly, the imaging lens according to the Example 2 satisfies the above-described conditional expressions.

Figure 5:
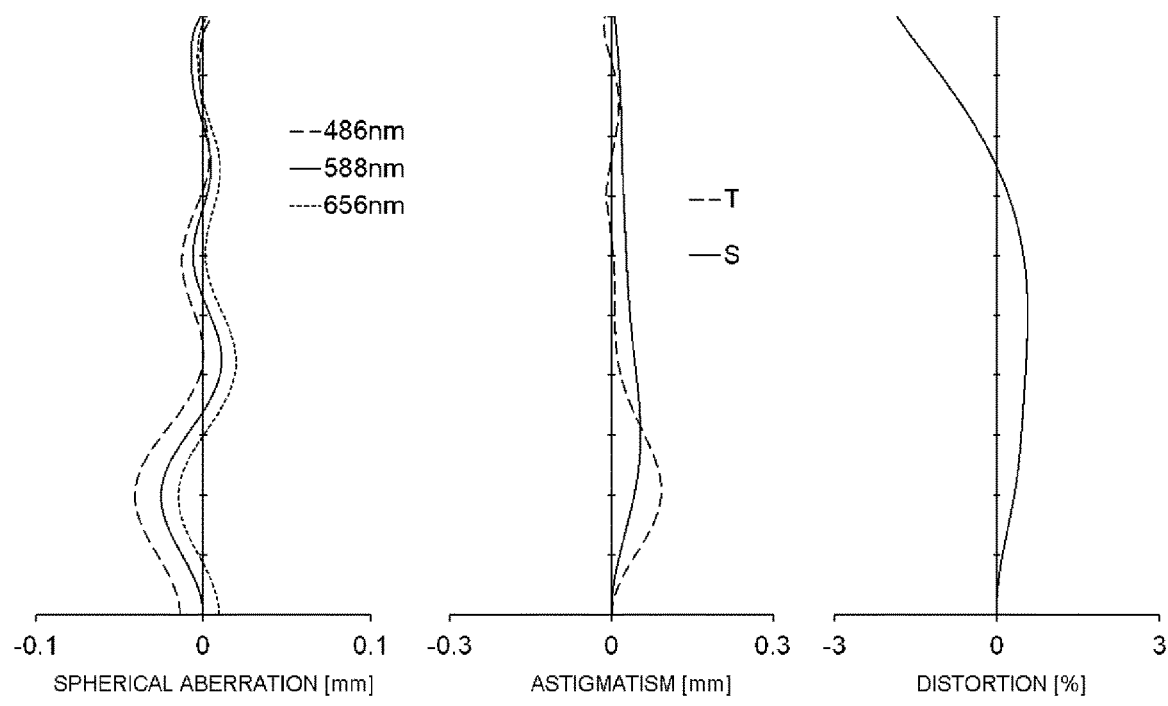
FIG. 5 is an aberration diagram showing spherical aberration, astigmatism, and distortion of the imaging lens of FIG. 4.
Figure 6:
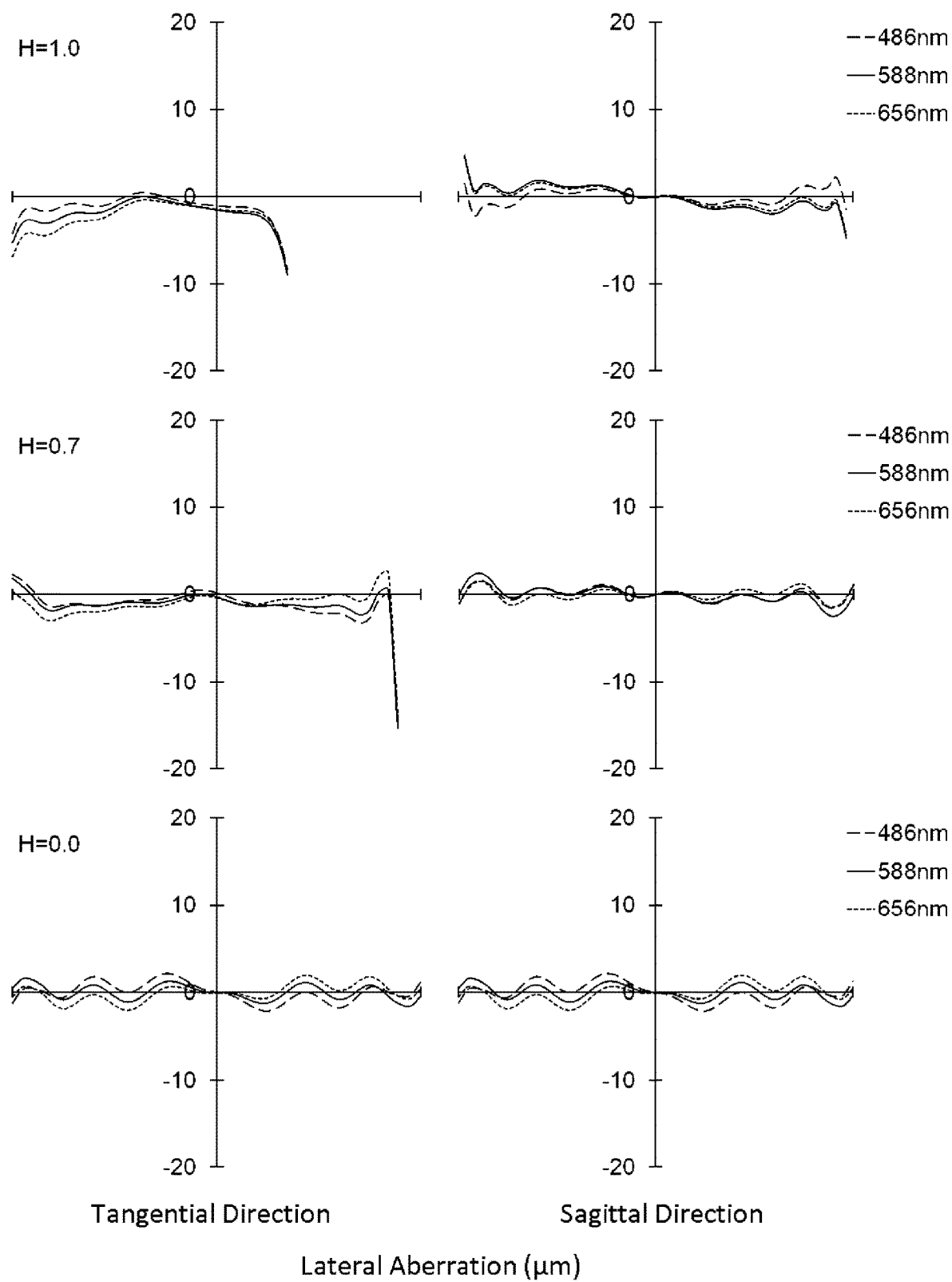
FIG. 6 is an aberration diagram showing a lateral aberration of the imaging lens of FIG. 4.
Figure 7:
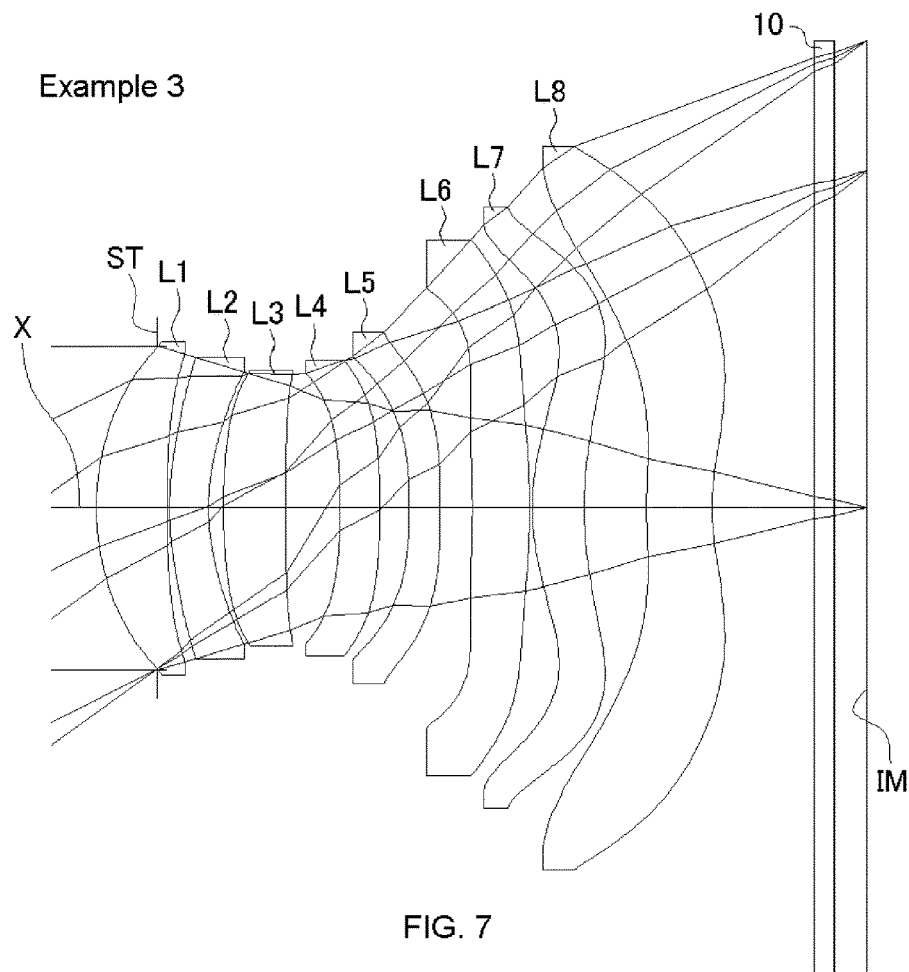
FIG. 7 is a sectional view of a schematic configuration of an imaging lens in Example 3 of the present invention.

FIG. 5 shows spherical aberration (mm), astigmatism (mm), and distortion (%), respectively. FIG. 6 shows a lateral aberration corresponding to the image height ratio H. As shown in FIGS. 5 and 6, according to the imaging lens of the Example 2, aberrations can be properly corrected.

EXAMPLE 3

The basic lens data is shown below in Table 5.

TABLE 5 f = 7.14 mm Fno = 2.1 ω = 35.5°

| | i | r | d | nd | νd | [mm] |
|---|---|---|---|---|---|---|
| ST | 1 | ∞ | ∞ −0.645 | | | |
| L1 | 2* | 2.768 | 0.750 | 1.5445 | 56.4 | f1 = 6.191 |
| | 3* | 13.985 | 0.029 | | | |
| L2 | 4* | 3.601 | 0.414 | 1.6707 | 19.2 | f2 = −12.630 |
| | 5* | 2.410 | 0.158 | | | |
| L3 | 6* | 7.088 | 0.657 | 1.5445 | 56.4 | f3 = 14.940 |
| | 7* | 53.306 | 0.578 | | | |
| L4 | 8* | −8.139 | 0.421 | 1.5445 | 56.4 | f4 = −35.946 |
| | 9* | −14.189 | 0.313 | | | |
| L5 | 10* | −8.045 | 0.329 | 1.6707 | 19.2 | f5 = −17.816 |
| | 11* | −25.021 | 0.342 | | | |
| L6 | 12* | −10.864 | 0.609 | 1.6142 | 25.6 | f6 = 94.657 |
| | 13* | −9.349 | 0.030 | | | |
| L7 | 14* | 2.565 | 0.547 | 1.5348 | 55.7 | f7 = 9.328 |
| | 15* | 4.886 | 0.662 | | | |
| L8 | 16* | 6.761 | 0.696 | 1.5348 | 55.7 | f8 = −8.017 |
| | 17* | 2.530 | 1.086 | | | |
| | 18 | ∞ | 0.210 | 1.5168 | 64.2 | |
| | 19 | ∞ | 0.343 | | | |
| (IM) | | ∞ | | | | | f67 = 8.303 mm
R7f = 2.565 mm
R7r = 4.886 mm
D34 = 0.578 mm
D45 = 0.313 mm
D78 = 0.662 mm
T7 = 0.547 mm
T8 = 0.696 mm
TL = 8.102 mm
Hmax = 5.1 mm

TABLE 6

| Aspheric Surface Data | | | | | |
|---|---|---|---|---|---|
| i | k | A4 | A6 | A8 | A10 |
| 2 | −5.374E−01 | 1.285E−02 | −1.657E−02 | 2.785E−02 | −2.679E−02 |
| 3 | 0.000E+00 | 3.377E−02 | −8.007E−02 | 1.485E−01 | −1.701E−01 |
| 4 | −1.167E+00 | 5.640E−03 | −8.636E−02 | 1.655E−01 | −1.931E−01 |
| 5 | −1.894E+00 | −1.375E−02 | 1.083E−02 | −4.504E−02 | 9.150E−02 |
| 6 | 0.000E+00 | 2.669E−02 | −3.456E−02 | 8.789E−02 | −1.217E−01 |
| 7 | 0.000E+00 | 3.635E−03 | 1.395E−02 | −2.536E−02 | 3.710E−02 |
| 8 | 0.000E+00 | −6.648E−02 | 8.166E−02 | −1.640E−01 | 1.938E−01 |
| 9 | 0.000E+00 | −5.834E−02 | −3.658E−03 | 5.825E−02 | −1.111E−01 |
| 10 | 0.000E+00 | −1.619E−01 | 1.741E−01 | −2.071E−01 | 1.760E−01 |
| 11 | 0.000E+00 | −1.282E−01 | 1.120E−01 | −9.316E−02 | 4.877E−02 |
| 12 | 0.000E+00 | 2.164E−02 | 2.583E−02 | −3.271E−02 | 1.738E−02 |
| 13 | 0.000E+00 | −1.232E−02 | 2.129E−02 | −7.383E−03 | 3.126E−04 |
| 14 | −2.175E+00 | −2.573E−02 | 4.960E−03 | −5.292E−03 | 2.051E−03 |
| 15 | 0.000E+00 | 1.549E−02 | −1.458E−02 | 2.111E−03 | 9.099E−05 |
| 16 | 3.101E−01 | −1.058E−01 | 3.538E−02 | −7.631E−03 | 1.042E−03 |
| 17 | −9.745E+00 | −5.409E−02 | 1.503E−02 | −3.241E−03 | 4.807E−04 |

| i | A12 | A14 | A16 | A18 | A20 |
|---|---|---|---|---|---|
| 2 | 1.611E−02 | −5.910E−03 | 1.241E−03 | −1.244E−04 | 2.895E−06 |
| 3 | 1.274E−01 | −6.200E−02 | 1.886E−02 | −3.248E−03 | 2.403E−04 |
| 4 | 1.471E−01 | −7.271E−02 | 2.246E−02 | −3.930E−03 | 2.966E−04 |
| 5 | −1.001E−01 | 6.509E−02 | −2.508E−02 | 5.285E−03 | −4.676E−04 |

TABLE 6-continued

Aspheric Surface Data

| | | | | | |
|---|---|---|---|---|---|
| 6 | 1.073E-01 | -6.004E-02 | 2.074E-02 | -4.060E-03 | 3.484E-04 |
| 7 | -3.282E-02 | 1.768E-02 | -5.536E-03 | 8.839E-04 | -5.221E-05 |
| 8 | -1.474E-01 | 7.105E-02 | -2.083E-02 | 3.345E-03 | -2.219E-04 |
| 9 | 1.085E-01 | -6.300E-02 | 2.197E-02 | -4.243E-03 | 3.490E-04 |
| 10 | -1.020E-01 | 3.901E-02 | -9.345E-03 | 1.288E-03 | -8.055E-05 |
| 11 | -1.549E-02 | 2.704E-03 | -1.497E-04 | -2.206E-05 | 2.846E-06 |
| 12 | -5.879E-03 | 1.308E-03 | -1.844E-04 | 1.477E-05 | -5.034E-07 |
| 13 | 3.787E-04 | -1.105E-04 | 1.447E-05 | -9.520E-07 | 2.543E-08 |
| 14 | -4.222E-04 | 4.948E-05 | -3.204E-06 | 1.040E-07 | -1.279E-09 |
| 15 | -8.366E-05 | 1.326E-05 | -1.006E-06 | 3.833E-08 | -5.778E-10 |
| 16 | -8.978E-05 | 4.886E-06 | -1.636E-07 | 3.086E-09 | -2.488E-11 |
| 17 | -4.657E-05 | 2.851E-06 | -1.061E-07 | 2.186E-09 | -1.880E-11 |

The values of the respective conditional expressions are as follows:

D34/f=0.08
f3/f1=2.41
f3/f=2.09
f4/f3=-2.41
f4/f=-5.04
D45/D34=0.54
f67/f=1.16
f7/f=1.31
R7r/R7f=1.91
T7/T8=0.79
f8/f7=-0.86
D78/f=0.09
TL/f=1.14
TL/Hmax=1.59

Accordingly, the imaging lens according to the Example 3 satisfies the above-described conditional expressions.

Figure 8:
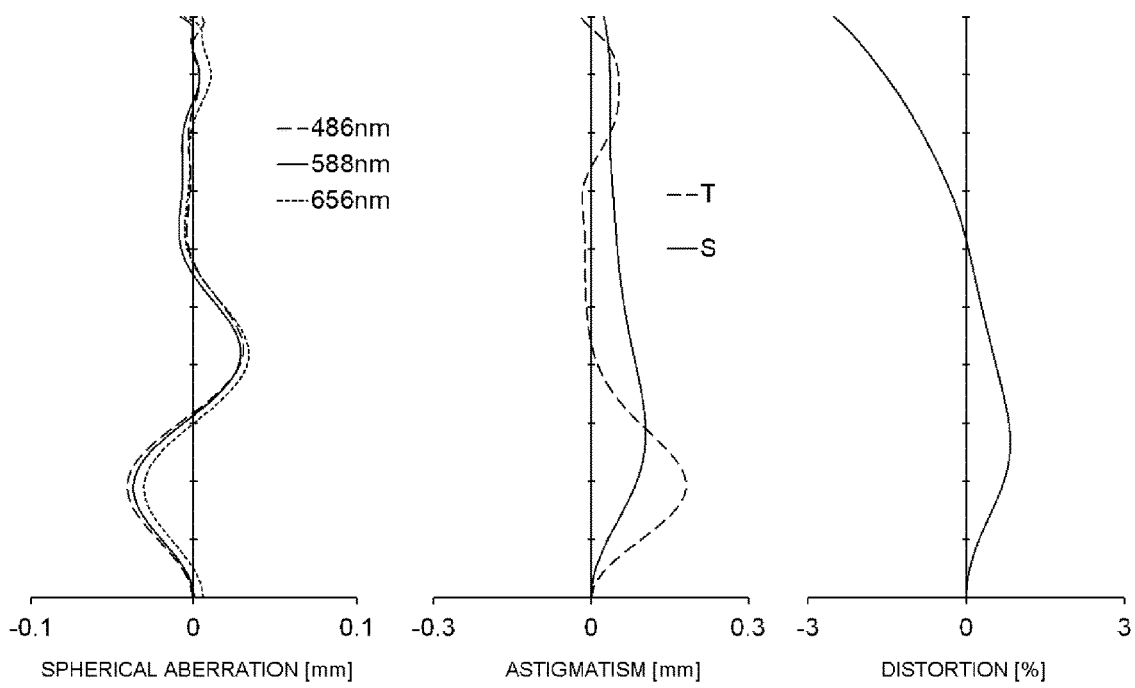
FIG. 8 is an aberration diagram showing spherical aberration, astigmatism, and distortion of the imaging lens of FIG. 7.
Figure 9:
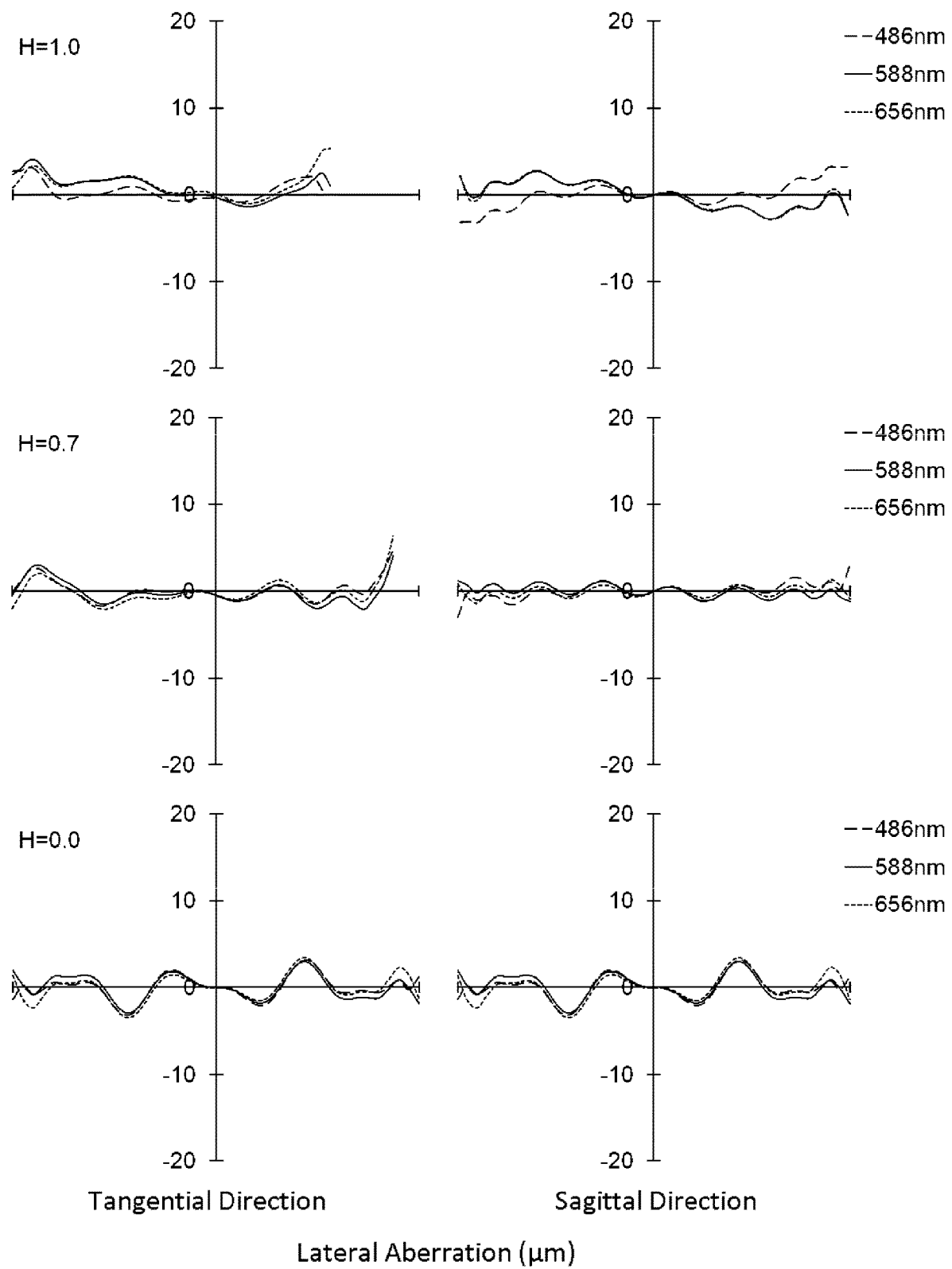
FIG. 9 is an aberration diagram showing a lateral aberration of the imaging lens of FIG. 7.
Figure 10:
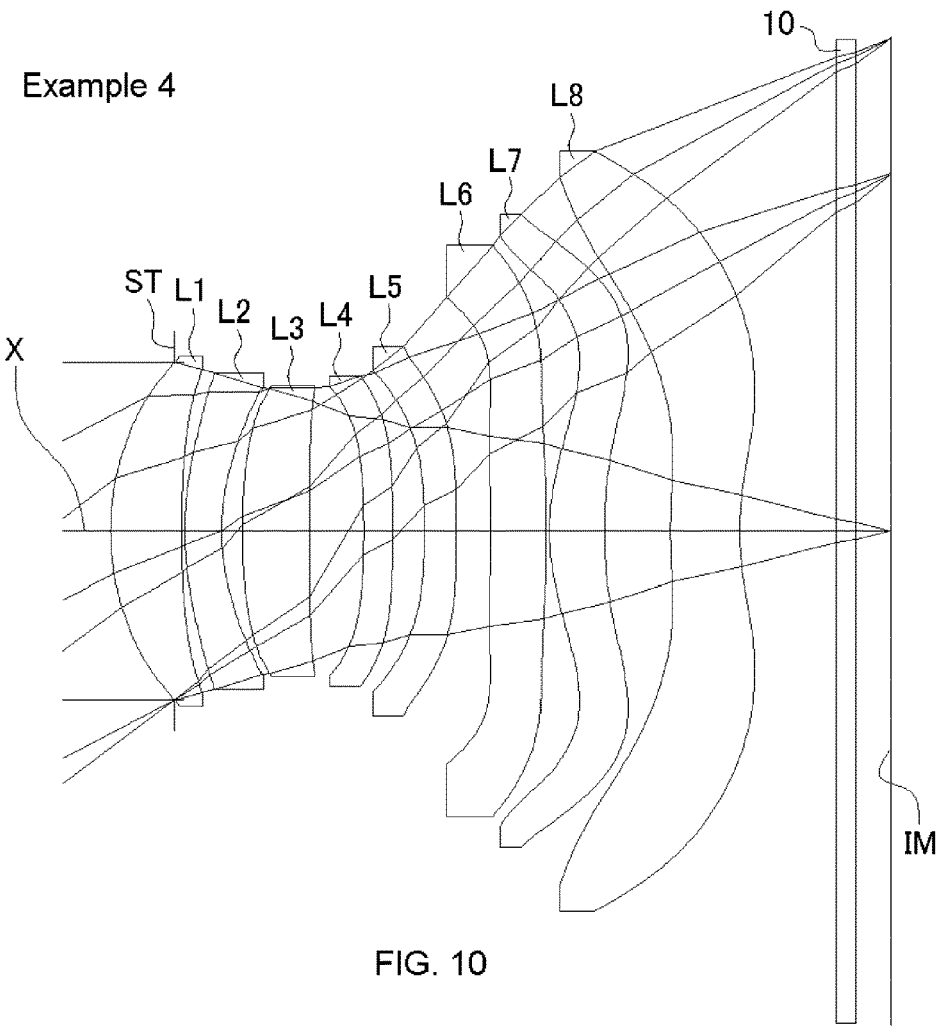
FIG. 10 is a sectional view of a schematic configuration of an imaging lens in Example 4 of the present invention.

FIG. 8 shows spherical aberration (mm), astigmatism (mm), and distortion (%), respectively. FIG. 9 shows a lateral aberration corresponding to the image height ratio H. As shown in FIGS. 8 and 9, according to the imaging lens of the Example 3, aberrations can be properly corrected.

EXAMPLE 4

The basic lens data is shown below in Table 7.

TABLE 7 f = 6.87 mm Fno = 2.0 ω = 36.6°

| | i | r | d | n d | ν d | [mm] |
|---|---|---|---|---|---|---|
| ST | 1 | ∞ | ∞ | | | |
| | | ∞ | -0.645 | | | |

TABLE 7-continued f = 6.87 mm Fno = 2.0 ω = 36.6°

| | i | r | d | n d | ν d | [mm] |
|---|---|---|---|---|---|---|
| L1 | 2* | 2.755 | 0.722 | 1.5445 | 56.4 | f1 = 6.391 |
| | 3* | 12.008 | 0.033 | | | |
| L2 | 4* | 3.323 | 0.376 | 1.6707 | 19.2 | f2 = -12.496 |
| | 5* | 2.272 | 0.210 | | | |
| L3 | 6* | 6.682 | 0.678 | 1.5445 | 56.4 | f3 = 13.266 |
| | 7* | 86.149 | 0.555 | | | |
| L4 | 8* | -11.824 | 0.294 | 1.5445 | 56.4 | f4 = -47.434 |
| | 9* | -22.001 | 0.320 | | | |
| L5 | 10* | -11.583 | 0.326 | 1.6707 | 19.2 | f5 = -18.851 |
| | 11* | -139.637 | 0.353 | | | |
| L6 | 12* | -11.532 | 0.559 | 1.6142 | 25.6 | f6 = -100.681 |
| | 13* | -14.437 | 0.030 | | | |
| L7 | 14* | 2.415 | 0.560 | 1.5348 | 55.7 | f7 = 8.551 |
| | 15* | 4.704 | 0.674 | | | |
| L8 | 16* | 5.673 | 0.701 | 1.5348 | 55.7 | f8 = -8.272 |
| | 17* | 2.379 | 0.974 | | | |
| | 18 | ∞ | 0.210 | 1.5168 | 64.2 | |
| | 19 | ∞ | 0.348 | | | |
| (IM) | | ∞ | | | | | f67 = 9.192 mm
R7f = 2.415 mm
R7r = 4.704 mm
D34 = 0.555 mm
D45 = 0.320 mm
D78 = 0.674 mm
T7 = 0.560 mm
T8 = 0.701 mm
TL = 7.851 mm
Hmax = 5.1 mm

TABLE 8

Aspheric Surface Data

| i | k | A4 | A6 | A8 | A10 |
|---|---|---|---|---|---|
| 2 | -5.374E-01 | 1.294E-02 | -1.686E-02 | 2.797E-02 | -2.681E-02 |
| 3 | 0.000E+00 | 3.340E-02 | -8.024E-02 | 1.486E-01 | -1.701E-01 |
| 4 | -1.167E+00 | 4.776E-03 | -8.629E-02 | 1.655E-01 | -1.931E-01 |
| 5 | -1.894E+00 | -1.023E-02 | 1.070E-02 | -4.505E-02 | 9.134E-02 |
| 6 | 0.000E+00 | 2.727E-02 | -3.508E-02 | 8.738E-02 | -1.218E-01 |
| 7 | 0.000E+00 | 2.214E-03 | 1.315E-02 | -2.608E-02 | 3.721E-02 |
| 8 | 0.000E+00 | -6.407E-02 | 8.217E-02 | -1.664E-01 | 1.941E-01 |
| 9 | 0.000E+00 | -4.943E-02 | -4.383E-03 | 5.733E-02 | -1.114E-01 |
| 10 | 0.000E+00 | -1.538E-01 | 1.755E-01 | -2.075E-01 | 1.759E-01 |
| 11 | 0.000E+00 | -1.294E-01 | 1.133E-01 | -9.324E-02 | 4.872E-02 |
| 12 | 0.000E+00 | 2.282E-02 | 2.559E-02 | -3.259E-02 | 1.737E-02 |
| 13 | 0.000E+00 | -1.284E-02 | 2.131E-02 | -7.359E-03 | 3.122E-04 |

TABLE 8-continued

Aspheric Surface Data

| | | | | | |
|---|---|---|---|---|---|
| 14 | −2.759E+00 | −2.262E−02 | 5.172E−03 | −5.306E−03 | 2.048E−03 |
| 15 | 0.000E+00 | 1.615E−02 | −1.460E−02 | 2.115E−03 | 9.085E−05 |
| 16 | −3.463E−01 | −1.079E−01 | 3.551E−02 | −7.633E−03 | 1.042E−03 |
| 17 | −8.507E+00 | −5.350E−02 | 1.495E−02 | −3.240E−03 | 4.807E−04 |

| i | A12 | A14 | A16 | A18 | A20 |
|---|---|---|---|---|---|
| 2 | 1.610E−02 | −5.909E−03 | 1.242E−03 | −1.241E−04 | 2.776E−06 |
| 3 | 1.274E−01 | −6.200E−02 | 1.886E−02 | −3.248E−03 | 2.400E−04 |
| 4 | 1.471E−01 | −7.271E−02 | 2.246E−02 | −3.931E−03 | 2.969E−04 |
| 5 | −1.001E−01 | 6.511E−02 | −2.507E−02 | 5.284E−03 | −4.695E−04 |
| 6 | 1.073E−01 | −6.003E−02 | 2.075E−02 | −4.055E−03 | 3.447E−04 |
| 7 | −3.270E−02 | 1.769E−02 | −5.551E−03 | 8.785E−04 | −4.674E−05 |
| 8 | −1.472E−01 | 7.108E−02 | −2.083E−02 | 3.346E−03 | −2.235E−04 |
| 9 | 1.086E−01 | −6.295E−02 | 2.198E−02 | −4.246E−03 | 3.476E−04 |
| 10 | −1.021E−01 | 3.901E−02 | −9.336E−03 | 1.291E−03 | −8.158E−05 |
| 11 | −1.549E−02 | 2.705E−03 | −1.486E−04 | −2.180E−05 | 2.749E−06 |
| 12 | −5.881E−03 | 1.308E−03 | −1.843E−04 | 1.477E−05 | −5.044E−07 |
| 13 | 3.783E−04 | −1.106E−04 | 1.447E−05 | −9.516E−07 | 2.547E−08 |
| 14 | −4.224E−04 | 4.947E−05 | −3.203E−06 | 1.041E−07 | −1.271E−09 |
| 15 | −8.368E−05 | 1.325E−05 | −1.006E−06 | 3.830E−08 | −5.840E−10 |
| 16 | −8.978E−05 | 4.886E−06 | −1.636E−07 | 3.084E−09 | −2.504E−11 |
| 17 | −4.658E−05 | 2.851E−06 | −1.061E−07 | 2.188E−09 | −1.903E−11 |

The values of the respective conditional expressions are as follows:
D34/f=0.08
f3/f1=2.08
f3/f=1.93
f4/f3=−3.58
f4/f=−6.91
D45/D34=0.58
f67/f=1.34
f7/f=1.25
R7r/R7f=1.95
T7/T8=0.80
f8/f7=−0.97
D78/f=0.10
TL/f=1.14
TL/Hmax=1.54

Accordingly, the imaging lens according to the Example 4 satisfies the above-described conditional expressions.

Figure 11:
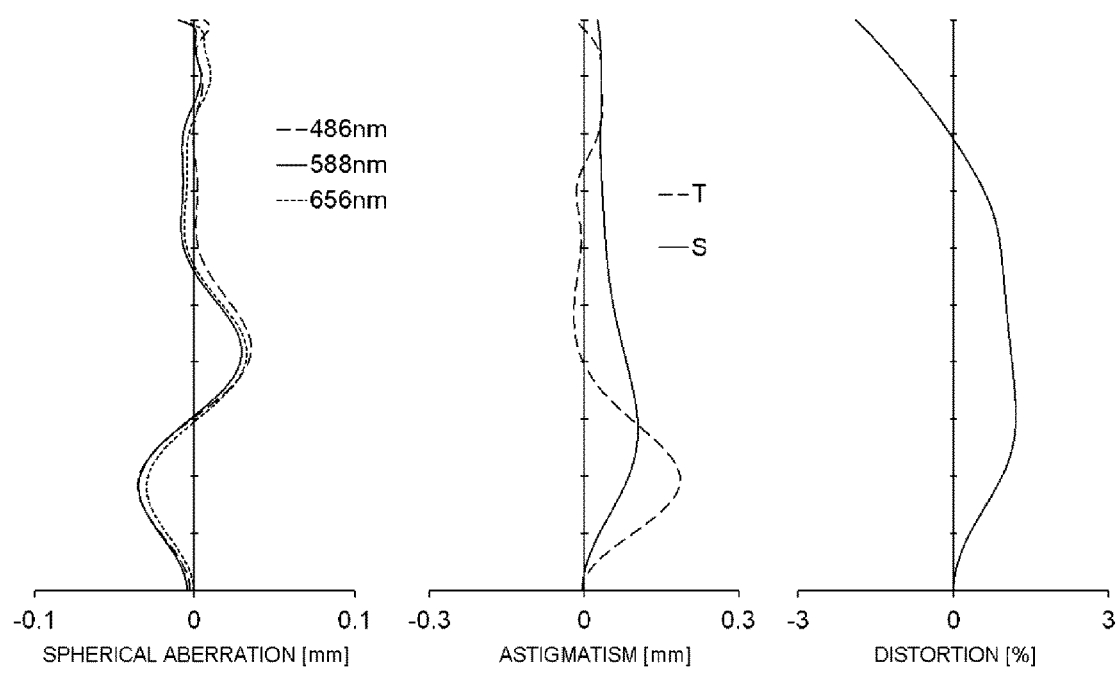
FIG. 11 is an aberration diagram showing spherical aberration, astigmatism, and distortion of the imaging lens of FIG. 10.
Figure 12:
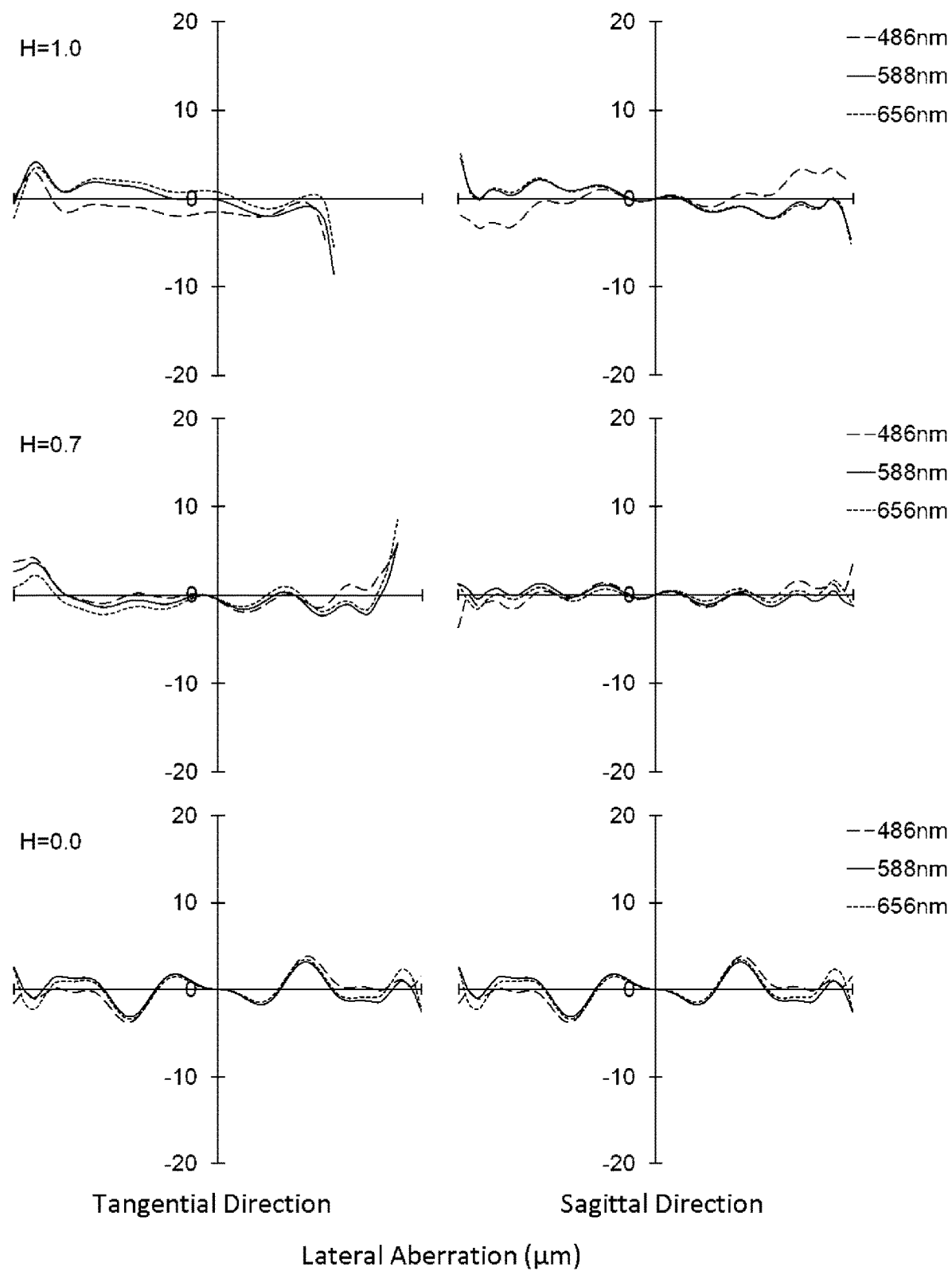
FIG. 12 is an aberration diagram showing a lateral aberration of the imaging lens of FIG. 10.
Figure 13:
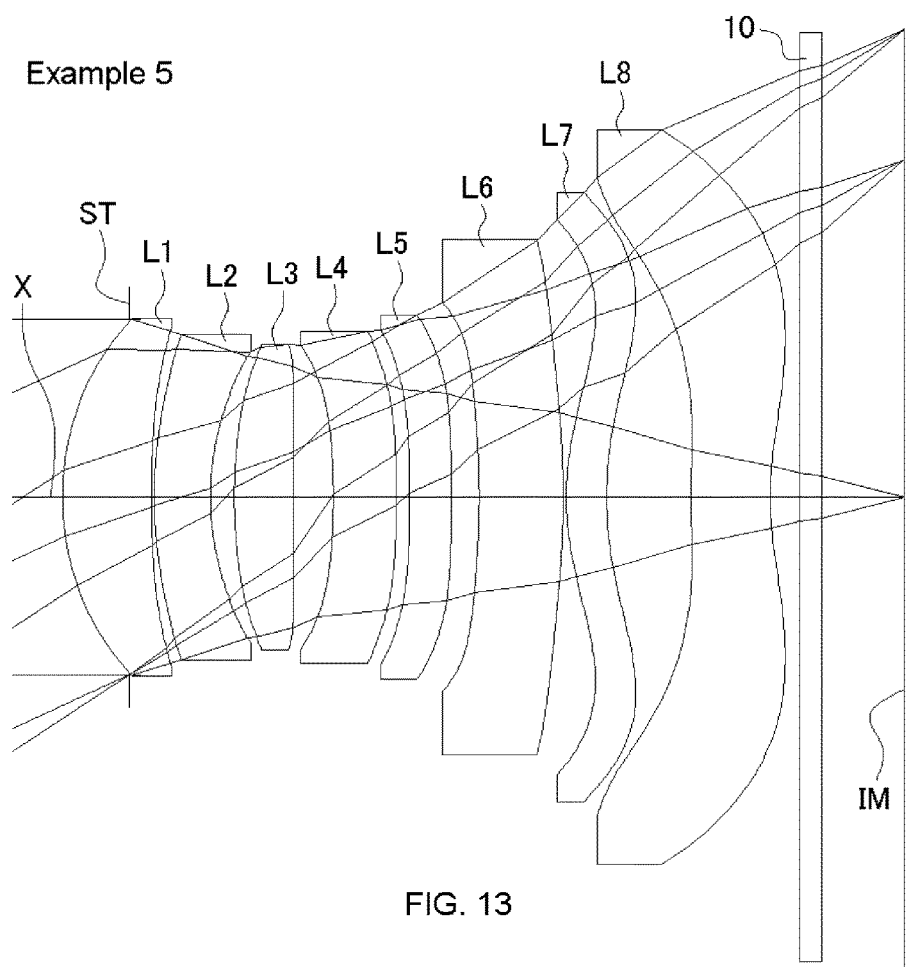
FIG. 13 is a sectional view of a schematic configuration of an imaging lens in Example 5 of the present invention.

FIG. 11 shows spherical aberration (mm), astigmatism (mm), and distortion (%), respectively. FIG. 12 shows a lateral aberration corresponding to the image height ratio H. As shown in FIGS. 11 and 12, according to the imaging lens of the Example 4, aberrations can be properly corrected.

EXAMPLE 5

The basic lens data is shown below in Table 9.

TABLE 9 f = 7.02 mm Fno = 2.0 ω = 33.2°

| | i | r | d | n d | ν d | [mm] |
|---|---|---|---|---|---|---|
| ST | 1 | ∞ | ∞ | | | |
| | | ∞ | −0.645 | | | |
| L1 | 2* | 2.693 | 0.857 | 1.5445 | 56.4 | f1 = 6.273 |
| | 3* | 11.300 | 0.028 | | | |
| L2 | 4* | 4.289 | 0.543 | 1.6707 | 19.2 | f2 = −10.240 |
| | 5* | 2.506 | 0.232 | | | |
| L3 | 6* | 5.245 | 0.574 | 1.5445 | 56.4 | f3 = 9.863 |
| | 7* | 216.791 | 0.382 | | | |
| L4 | 8* | −7.857 | 0.610 | 1.5445 | 56.4 | f4 = −29.165 |
| | 9* | −15.978 | 0.123 | | | |
| L5 | 10* | ∞ | 0.408 | 1.6707 | 19.2 | f5 = ∞ |
| | 11* | ∞ | 0.270 | | | |
| L6 | 12* | −8.394 | 0.811 | 1.6142 | 25.6 | f6 = −76.733 |
| | 13* | −10.588 | 0.030 | | | |
| L7 | 14* | 2.686 | 0.392 | 1.5348 | 55.7 | f7 = 16.994 |
| | 15* | 3.620 | 0.817 | | | |
| L8 | 16* | 10.980 | 0.764 | 1.5348 | 55.7 | f8 = −7.802 |
| | 17* | 2.950 | 0.285 | | | |
| | 18 | ∞ | 0.210 | 1.5168 | 64.2 | |
| | 19 | ∞ | 0.800 | | | |
| (IM) | | ∞ | | | | | f67 = 21.050 mm
R7f = 2.686 mm
R7r = 3.620 mm
D34 = 0.382 mm
D45 = 0.123 mm
D78 = 0.817 mm
T7 = 0.392 mm
T8 = 0.764 mm
TL = 8.064 mm
Hmax = 4.6 mm

TABLE 10

Aspheric Surface Data

| i | k | A4 | A6 | A8 | A10 |
|---|---|---|---|---|---|
| 2 | −4.137E−01 | 9.007E−03 | −9.865E−03 | 1.930E−02 | −2.060E−02 |
| 3 | 0.000E+00 | 3.436E−02 | −7.935E−02 | 1.478E−01 | −1.715E−01 |
| 4 | −7.930E−03 | 1.070E−02 | −7.766E−02 | 1.543E−01 | −1.862E−01 |
| 5 | −1.969E+00 | −7.693E−03 | 1.518E−02 | −4.237E−02 | 8.386E−02 |
| 6 | 0.000E+00 | 1.096E−02 | −2.269E−02 | 6.627E−02 | −9.977E−02 |
| 7 | 0.000E+00 | −6.892E−03 | 8.386E−03 | −1.945E−02 | 3.244E−02 |
| 8 | 0.000E+00 | −3.956E−02 | 4.339E−02 | −1.102E−01 | 1.559E−01 |
| 9 | 0.000E+00 | −5.754E−02 | 1.932E−02 | 3.706E−02 | −9.616E−02 |
| 10 | 0.000E+00 | −1.127E−01 | 1.369E−01 | −1.680E−01 | 1.493E−01 |
| 11 | 0.000E+00 | −8.461E−02 | 8.953E−02 | −8.554E−02 | 4.982E−02 |
| 12 | 0.000E+00 | −4.333E−03 | 3.406E−02 | −3.575E−02 | 1.764E−02 |
| 13 | 0.000E+00 | −1.832E−02 | 2.024E−02 | −6.689E−03 | 2.768E−04 |
| 14 | −1.543E+00 | −3.453E−02 | 8.851E−03 | −5.532E−03 | 1.998E−03 |
| 15 | 0.000E+00 | −3.873E−03 | −7.948E−03 | 9.570E−04 | 1.862E−04 |
| 16 | 0.000E+00 | −8.163E−02 | 2.952E−02 | −7.231E−03 | 1.056E−03 |
| 17 | −1.103E+01 | −3.989E−02 | 1.167E−02 | −2.669E−03 | 4.015E−04 |

| i | A12 | A14 | A16 | A18 | A20 |
|---|---|---|---|---|---|
| 2 | 1.375E−02 | −5.713E−03 | 1.428E−03 | −1.946E−04 | 1.083E−05 |
| 3 | 1.285E−01 | −6.216E−02 | 1.873E−02 | −3.190E−03 | 2.340E−04 |
| 4 | 1.448E−01 | −7.268E−02 | 2.273E−02 | −4.021E−03 | 3.065E−04 |
| 5 | −9.409E−02 | 6.348E−02 | −2.564E−02 | 5.753E−03 | −5.493E−04 |
| 6 | 9.621E−02 | −5.935E−02 | 2.227E−02 | −4.577E−03 | 3.900E−04 |
| 7 | −3.175E−02 | 1.771E−02 | −5.748E−03 | 9.787E−04 | −6.521E−05 |
| 8 | −1.359E−01 | 7.204E−02 | −2.249E−02 | 3.733E−03 | −2.395E−04 |
| 9 | 1.027E−01 | −6.245E−02 | 2.237E−02 | −4.375E−03 | 3.594E−04 |
| 10 | −9.182E−02 | 3.805E−02 | −1.016E−02 | 1.594E−03 | −1.154E−04 |
| 11 | −1.748E−02 | 3.197E−03 | −4.324E−05 | −8.775E−05 | 1.048E−05 |
| 12 | −5.788E−03 | 1.314E−03 | −1.847E−04 | 1.196E−05 | −1.492E−07 |
| 13 | 3.785E−04 | −1.108E−04 | 1.429E−05 | −9.111E−07 | 2.296E−08 |
| 14 | −4.169E−04 | 5.017E−05 | −3.255E−06 | 9.661E−08 | −9.531E−10 |
| 15 | −8.272E−05 | 1.262E−05 | −1.004E−06 | 4.229E−08 | −7.371E−10 |
| 16 | −9.073E−05 | 4.797E−06 | −1.645E−07 | 3.452E−09 | −2.544E−11 |
| 17 | −4.127E−05 | 2.833E−06 | −1.153E−07 | 2.011E−09 | 2.787E−12 |

The values of the respective conditional expressions are as follows:

D34/f=0.05
f3/f1=1.57
f3/f=1.40
f4/f3=−2.96
f4/f=−4.15
D45/D34=0.32
f67/f=3.00
f7/f=2.42
R7r/R7f=1.35
T7/T8=0.51
f8/f7=−0.46
D78/f=0.12
TL/f=1.15
TL/Hmax=1.75

Accordingly, the imaging lens according to the Example 5 satisfies the above-described conditional expressions.

Figure 14:
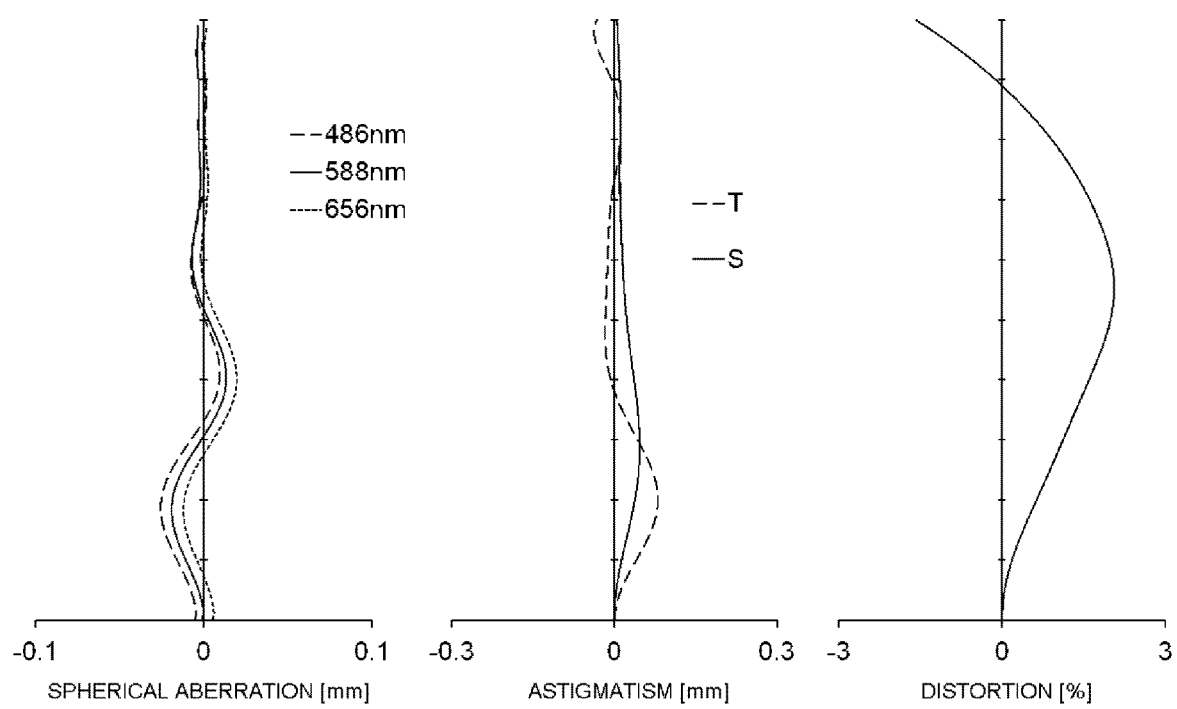
FIG. 14 is an aberration diagram showing spherical aberration, astigmatism, and distortion of the imaging lens of FIG. 13.
Figure 15:
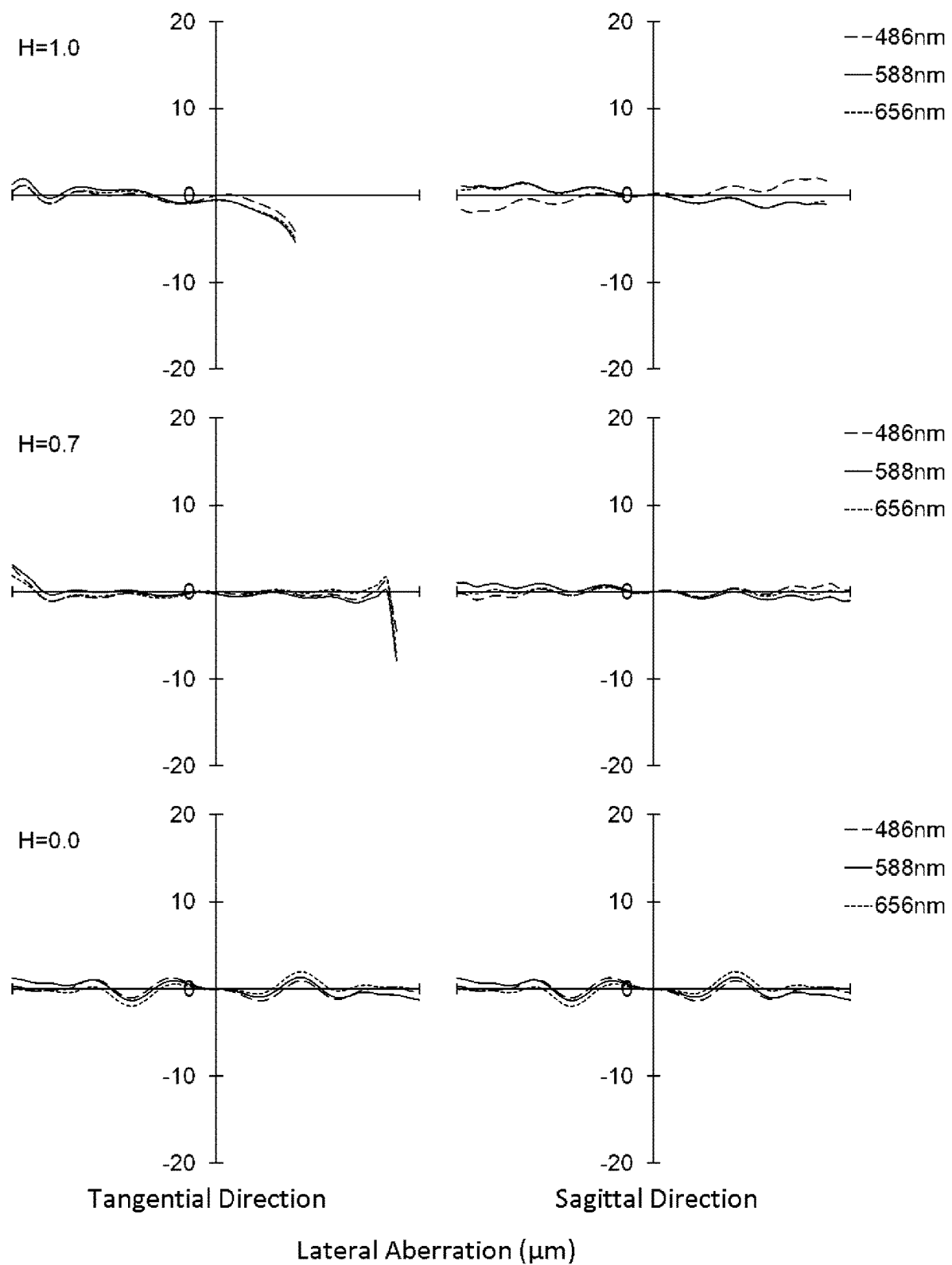
FIG. 15 is an aberration diagram showing a lateral aberration of the imaging lens of FIG. 13.
Figure 16:
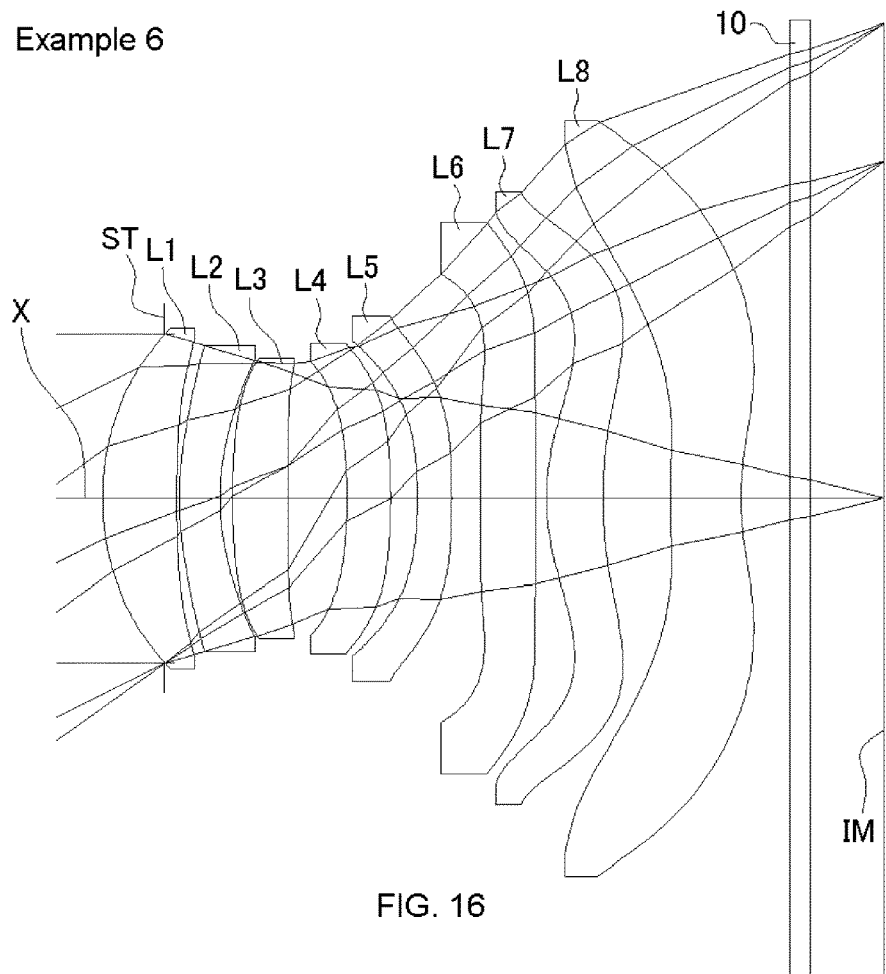
FIG. 16 is a sectional view of a schematic configuration of an imaging lens in Example 6 of the present invention.

FIG. 14 shows spherical aberration (mm), astigmatism (mm), and distortion (%), respectively. FIG. 15 shows a lateral aberration corresponding to the image height ratio H. As shown in FIGS. 14 and 15, according to the imaging lens of the Example 5, aberrations can be properly corrected.

EXAMPLE 6

The basic lens data is shown below in Table 11.

TABLE 11 f = 7.07 mm Fno = 2.1 ω = 35.8°

| | i | r | d | n d | v d | [mm] |
|---|---|---|---|---|---|---|
| | 1 | ∞ | ∞ | | | |
| ST | 1 | ∞ | −0.645 | | | |
| L1 | 2* | 2.770 | 0.777 | 1.5445 | 56.4 | f1 = 6.093 |
| | 3* | 15.118 | 0.027 | | | |
| L2 | 4* | 3.706 | 0.424 | 1.6707 | 19.2 | f2 = −12.432 |
| | 5* | 2.448 | 0.133 | | | |
| L3 | 6* | 8.116 | 0.576 | 1.5445 | 56.4 | f3 = 14.762 |
| | 7* | −811.770 | 0.617 | | | |
| L4 | 8* | −6.130 | 0.455 | 1.5445 | 56.4 | f4 = −33.071 |
| | 9* | −9.538 | 0.280 | | | |
| L5 | 10* | −6.330 | 0.360 | 1.6707 | 19.2 | f5 = −15.841 |
| | 11* | −16.015 | 0.300 | | | |
| L6 | 12* | ∞ | 0.583 | 1.6142 | 25.6 | f6 = ∞ |
| | 13* | ∞ | 0.111 | | | |
| L7 | 14* | 2.378 | 0.586 | 1.5348 | 55.7 | f7 = 7.917 |
| | 15* | 4.957 | 0.706 | | | |
| L8 | 16* | 7.385 | 0.737 | 1.5348 | 55.7 | f8 = −7.641 |
| | 17* | 2.539 | 0.515 | | | |

TABLE 11-continued f = 7.07 mm Fno = 2.1 ω = 35.8°

| i | r | d | n d | ν d |
|---|---|---|---|---|
| | | | | [mm] |
| 18 | ∞ | 0.210 | 1.5168 | 64.2 |
| 19 | ∞ | 0.771 | | |
| (IM) | ∞ | | | | f67 = 7.917 mm
R7f = 2.378 mm
R7r = 4.957 mm
D34 = 0.617 mm
D45 = 0.280 mm
D78 = 0.706 mm
T7 = 0.586 mm
T8 = 0.737 mm
TL = 8.096 mm
Hmax = 5.09 mm

TABLE 12

Aspheric Surface Data

| i | k | A4 | A6 | A8 | A10 |
|---|---|---|---|---|---|
| 2 | −5.374E−01 | 1.268E−02 | −1.628E−02 | 2.771E−02 | −2.677E−02 |
| 3 | 0.000E+00 | 3.507E−02 | −8.087E−02 | 1.487E−01 | −1.701E−01 |
| 4 | −1.167E+00 | 6.802E−03 | −8.706E−02 | 1.653E−01 | −1.931E−01 |
| 5 | −1.894E+00 | −1.477E−02 | 1.125E−02 | −4.636E−02 | 9.208E−02 |
| 6 | 0.000E+00 | 2.656E−02 | −3.412E−02 | 8.824E−02 | −1.217E−01 |
| 7 | 0.000E+00 | 4.780E−03 | 1.477E−02 | −2.503E−02 | 3.723E−02 |
| 8 | 0.000E+00 | −5.827E−02 | 7.459E−02 | −1.572E−01 | 1.910E−01 |
| 9 | 0.000E+00 | −5.854E−02 | −4.338E−03 | 5.873E−02 | −1.110E−01 |
| 10 | 0.000E+00 | −1.567E−01 | 1.712E−01 | −2.064E−01 | 1.759E−01 |
| 11 | 0.000E+00 | −1.237E−01 | 1.102E−01 | −9.251E−02 | 4.866E−02 |
| 12 | 0.000E+00 | 6.436E−03 | 3.009E−02 | −3.331E−02 | 1.742E−02 |
| 13 | 0.000E+00 | −2.435E−02 | 2.302E−02 | −7.493E−03 | 3.124E−04 |
| 14 | −2.929E+00 | −2.379E−02 | 4.901E−03 | −5.332E−03 | 2.051E−03 |
| 15 | 0.000E+00 | 1.539E−02 | −1.466E−02 | 2.124E−03 | 8.893E−05 |
| 16 | 3.555E−01 | −1.043E−01 | 3.533E−02 | −7.633E−03 | 1.042E−03 |
| 17 | −9.762E+00 | −5.346E−02 | 1.498E−02 | −3.243E−03 | 4.809E−04 |

| i | A12 | A14 | A16 | A18 | A20 |
|---|---|---|---|---|---|
| 2 | 1.612E−02 | −5.907E−03 | 1.241E−03 | −1.257E−04 | 3.173E−06 |
| 3 | 1.274E−01 | −6.200E−02 | 1.886E−02 | −3.247E−03 | 2.402E−04 |
| 4 | 1.471E−01 | −7.271E−02 | 2.246E−02 | −3.929E−03 | 2.961E−04 |
| 5 | −1.000E−01 | 6.500E−02 | −2.511E−02 | 5.307E−03 | −4.693E−04 |
| 6 | 1.073E−01 | −6.002E−02 | 2.072E−02 | −4.069E−03 | 3.534E−04 |
| 7 | −3.284E−02 | 1.764E−02 | −5.539E−03 | 8.959E−04 | −5.667E−05 |
| 8 | −1.470E−01 | 7.106E−02 | −2.083E−02 | 3.345E−03 | −2.234E−04 |
| 9 | 1.084E−01 | −6.303E−02 | 2.196E−02 | −4.239E−03 | 3.492E−04 |
| 10 | −1.020E−01 | 3.899E−02 | −9.344E−03 | 1.289E−03 | −8.028E−05 |
| 11 | −1.549E−02 | 2.704E−03 | −1.497E−04 | −2.206E−05 | 2.834E−06 |
| 12 | −5.887E−03 | 1.309E−03 | −1.841E−04 | 1.472E−05 | −5.048E−07 |
| 13 | 3.786E−04 | −1.105E−04 | 1.447E−05 | −9.518E−07 | 2.545E−08 |
| 14 | −4.219E−04 | 4.952E−05 | −3.201E−06 | 1.039E−07 | −1.318E−09 |
| 15 | −8.358E−05 | 1.327E−05 | −1.006E−06 | 3.819E−08 | −5.715E−10 |
| 16 | −8.978E−05 | 4−885E−06 | −1.635E−07 | 3.090E−09 | −2.527E−11 |
| 17 | −4.656E−05 | 2.852E−06 | −1.061E−07 | 2.184E−09 | −1.895E−11 |

The values of the respective conditional expressions are as follows:
D34/f=0.09
f3/f1=2.42
f3/f=2.09
f4/f3=−2.24
f4/f=−4.68
D45/D34=0.45
f67/f=1.12
f7/f=1.12
R7r/R7f=2.08
T7/T8=0.79
f8/f7=−0.97
D78/f=0.10
TL/f=1.15
TL/Hmax=1.59

Accordingly, the imaging lens according to the Example 6 satisfies the above-described conditional expressions.

Figure 17:
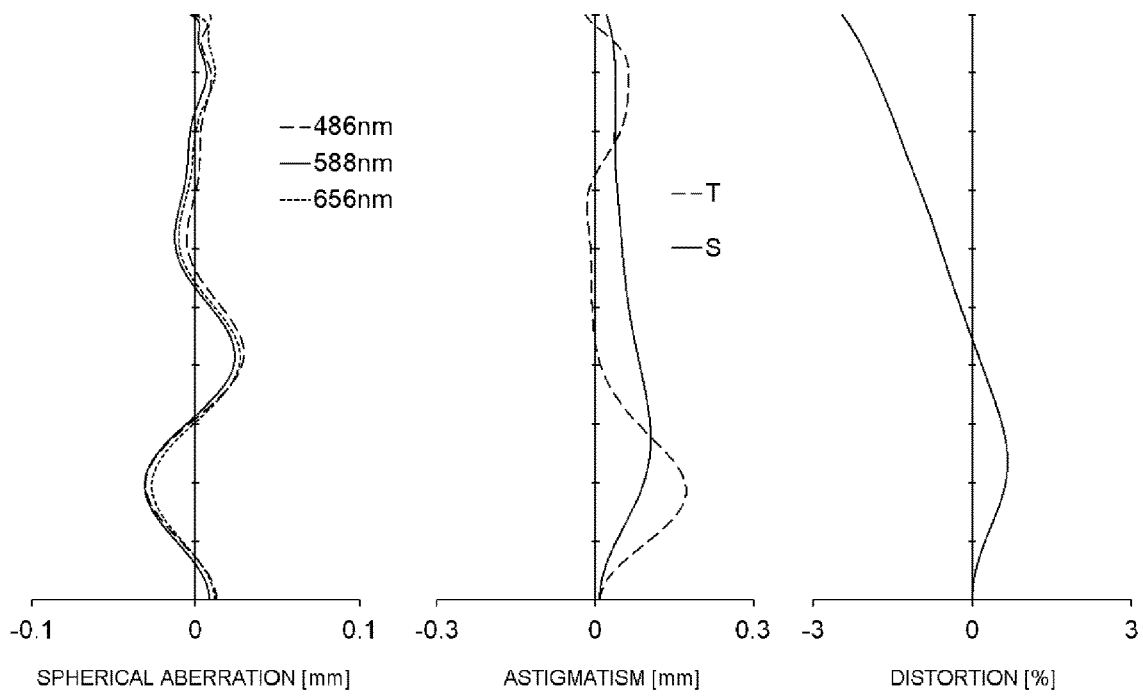
FIG. 17 is an aberration diagram showing spherical aberration, astigmatism, and distortion of the imaging lens of FIG. 16.
Figure 18:
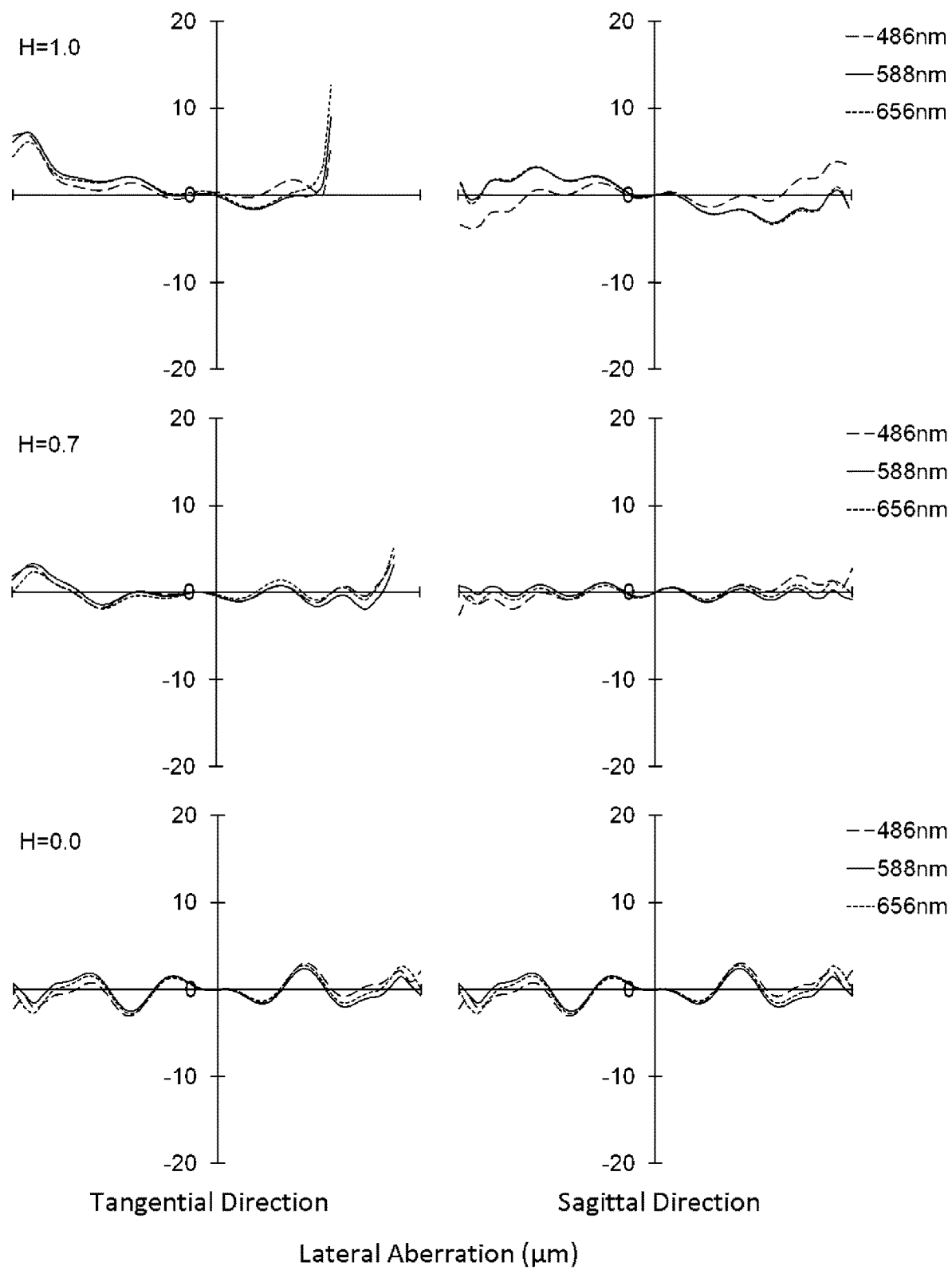
FIG. 18 is an aberration diagram showing a lateral aberration of the imaging lens of FIG. 16.

FIG. 17 shows spherical aberration (mm), astigmatism (mm), and distortion (%), respectively. FIG. 18 shows a lateral aberration corresponding to the image height ratio H. As shown in FIGS. 17 and 18, according to the imaging lens of the Example 6, aberrations can be properly corrected.

As described above, the imaging lens according to the present embodiments has the wide field of view (2ω) of 65° or more. More specifically, the imaging lenses of Examples 1 to 6 have fields of view of 66.4° to 73.2°. According to the imaging lens of the present embodiments, it is possible to take an image over a wider range than that taken by a conventional imaging lens.

In recent years, with advancement in digital-zoom technology to enlarge any range of an image obtained through an imaging lens by image processing, an image sensor with higher pixel count has been often applied in combination with an imaging lens of higher resolution. In the case of the image sensor with the higher pixel count, a light-receiving area per pixel often decreases, so that an image tends to be dark. The imaging lenses of Examples 1 to 6 have Fnos as small as 2.0 to 2.1. According to the imaging lenses of the present embodiments, it is possible to take a sufficiently bright image responding to the image sensor with the higher pixel count as mentioned above.

Therefore, when the imaging lens of the above-described embodiment is applied in an imaging optical system such as cameras built in mobile devices, namely, smartphones, cellular phones and mobile information terminals, digital still cameras, security cameras, onboard cameras, and network cameras, it is possible to attain both high performance and downsizing of the cameras.

The present invention is applicable in an imaging lens that is mounted in a relatively small-sized camera, such as cameras built in mobile devices, namely smartphones, cellular phones and mobile information terminals, digital still cameras, security cameras, onboard cameras, and network cameras.

DESCRIPTION OF REFERENCE NUMERALS

X: optical axis
ST: aperture stop
L1: first lens
L2: second lens
L3: third lens
L4: fourth lens
L5: fifth lens
L6: sixth lens
L7: seventh lens
L8: eighth lens
10: filter
IM: image plane

What is claimed is:

1. An imaging lens forming an image of an object on an image sensor and comprising, in order from an object side to an image side,
   a first lens with positive refractive power,
   a second lens with negative refractive power,
   a third lens with positive refractive power,
   a fourth lens with negative refractive power,
   a fifth lens,
   a sixth lens,
   a seventh lens with positive refractive power, and
   an eighth lens with negative refractive power,
   wherein said fourth lens is formed in a shape that curvature radii of an object-side surface and an image-side surface are both negative,
   said eighth lens has an aspheric image-side surface having at least one inflection point, and
   the following conditional expressions are satisfied:

$0.04 < D34/f < 0.15$, (9') $1.00 < R7r/R7f <= 2.08$ (9')

where
   f: a focal length of the overall optical system of the imaging lens,
   D34: a distance along the optical axis between the third lens and the fourth lens,
   R7f: a curvature radius of an object-side surface of the seventh lens, and
   R7r: a curvature radius of an image-side surface of the seventh lens.

2. The imaging lens according to claim 1, wherein the following conditional expression is satisfied:

$1.20 < f3/f1 < 5.50$ where
   f1: a focal length of the first lens, and
   f3: a focal length of the third lens.

3. The imaging lens according to claim 1, wherein the following conditional expression is satisfied:

$-5.50 < f4/f3 < -0.80$ where
   f3: a focal length of the third lens, and
   f4: a focal length of the fourth lens.

4. The imaging lens according to claim 1, wherein the following conditional expression is satisfied:

$0.02 < D45/D34 < 1.00$ where
   D34: a distance along the optical axis between the third lens and the fourth lens, and
   D45: a distance along the optical axis between the fourth lens and the fifth lens.

5. The imaging lens according to claim 1, wherein the following conditional expression is satisfied:

$0.80 < f67/f < 3.50$ where
   f: a focal length of the overall optical system of the imaging lens, and
   f67: a composite focal length of the sixth lens and the seventh lens.

6. The imaging lens according to claim 1, wherein the following conditional expression is satisfied:

$-1.20 < f8/f7 < -0.35$ where
   f7: a focal length of the seventh lens, and
   f8: a focal length of the eighth lens.

* * * * *